(12) United States Patent
Menner et al.

(10) Patent No.: US 11,977,374 B2
(45) Date of Patent: May 7, 2024

(54) SYSTEM AND METHOD FOR CALIBRATING FEEDBACK CONTROLLERS

(71) Applicant: Mitsubishi Electric Research Laboratories, Inc., Cambridge, MA (US)

(72) Inventors: Marcel Menner, Boston, MA (US); Karl Berntorp, Newton, MA (US); Stefano Di Cairano, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 124 days.

(21) Appl. No.: 17/403,222

(22) Filed: Aug. 16, 2021

(65) Prior Publication Data

US 2023/0038215 A1 Feb. 9, 2023

Related U.S. Application Data

(60) Provisional application No. 63/228,228, filed on Aug. 2, 2021.

(51) Int. Cl.
*G05B 23/02* (2006.01)
*G05B 13/02* (2006.01)
*G05B 13/04* (2006.01)

(52) U.S. Cl.
CPC ....... *G05B 23/0254* (2013.01); *G05B 13/027* (2013.01); *G05B 13/042* (2013.01); *G05B 13/048* (2013.01); *G05B 23/0294* (2013.01)

(58) Field of Classification Search
CPC ............. G05B 23/0254; G05B 13/027; G05B 13/042; G05B 13/048; G05B 23/0294
See application file for complete search history.

(56) References Cited

U.S. PATENT DOCUMENTS

| 8,447,443 | B1 | 5/2013 | Ryan et al. |
| 2009/0198350 | A1* | 8/2009 | Thiele ................. G05B 17/02 700/83 |

(Continued)

FOREIGN PATENT DOCUMENTS

CN 111152795 A * 5/2020 ............ B60W 40/10

OTHER PUBLICATIONS

Zhu et al., "Design and analysis of discrete-time robust Kalman" Automatica 38 (2002) 1069-1077 (Year: 2002).*

*Primary Examiner* — John C Kuan
(74) *Attorney, Agent, or Firm* — Gene Vinokur; Hironori Tsukamoto

(57) ABSTRACT

A system for controlling an operation of a machine for performing a task is disclosed. The system submits a sequence of control inputs to the machine and receives a feedback signal. The system further determines, at each control step, a current control input for controlling the machine based on the feedback signal including a current measurement of a current state of the system by applying a control policy transforming the current measurement into the current control input based on current values of control parameters in a set of control parameters of a feedback controller. Furthermore, the system may iteratively update a state of the feedback controller defined by the control parameters using a prediction model predicting values of the control parameters and a measurement model updating the predicted values to produce the current values of the control parameters that explain the sequence of measurements according to a performance objective.

18 Claims, 19 Drawing Sheets

(56) References Cited

U.S. PATENT DOCUMENTS

| | | |
|---|---|---|
| 2014/0249564 A1 | 9/2014 | Blevins et al. |
| 2015/0034553 A1* | 2/2015 | Kumar ............... G01N 33/1866 |
| | | 210/85 |
| 2016/0098022 A1* | 4/2016 | Wenzel .................. G05B 15/02 |
| | | 700/275 |
| 2016/0357169 A1* | 12/2016 | Di Cairano .......... G05B 19/106 |
| 2018/0275621 A1 | 9/2018 | Kniazev et al. |
| 2020/0293009 A1* | 9/2020 | Quirynen ............. G05B 13/041 |

\* cited by examiner

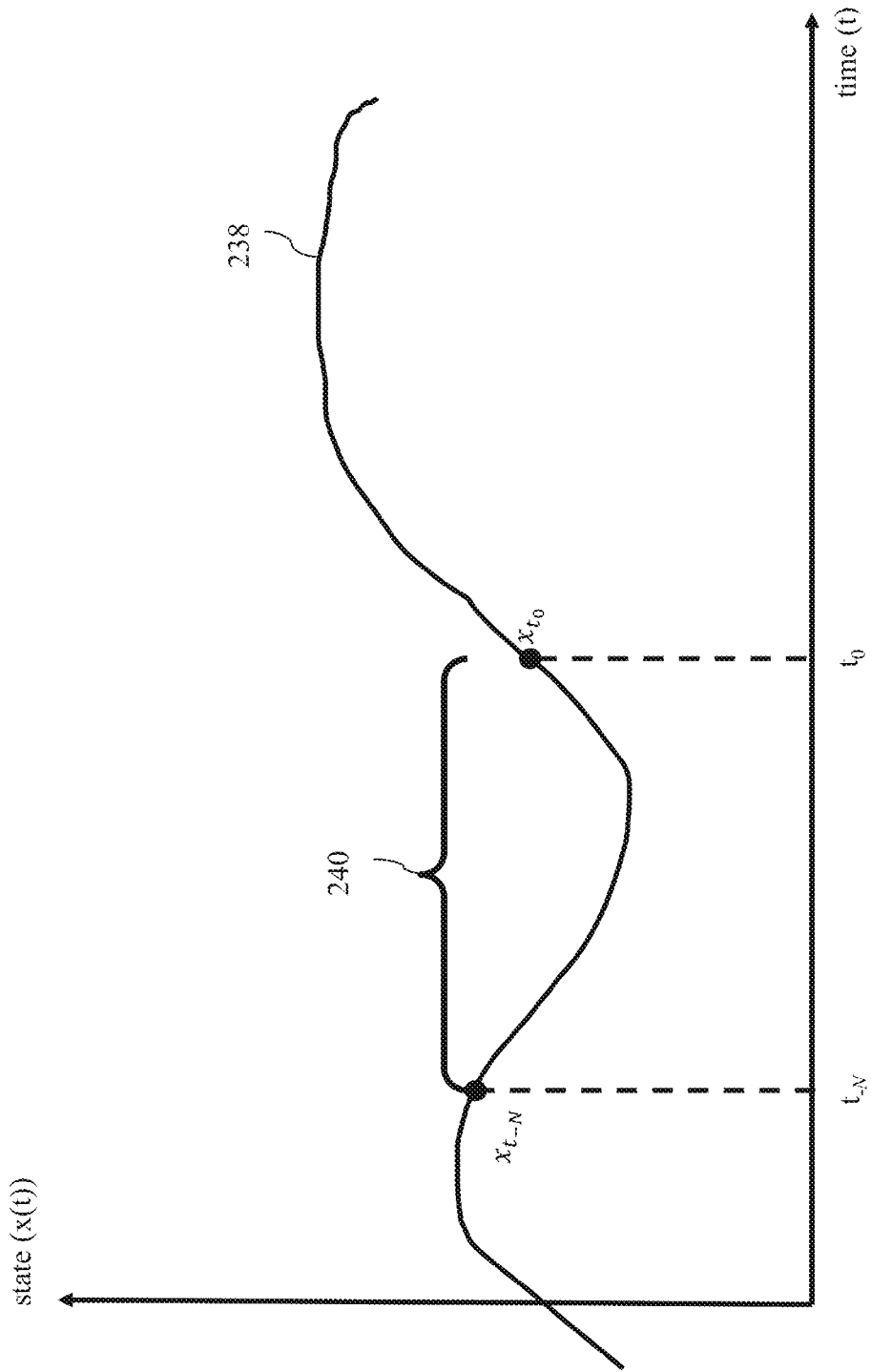

| Examples for performance objective | |
|---|---|
| 700 Cost function defining a deviation of state(s) from a reference state | 702 Cost function defining a deviation of control input(s) from a reference control input |
| 704 Cost function for state exceeding a certain region of operation | 706 Cost function for control input exceeding a certain region of operation |
| 708 Cost function for oscillations of one or more states | 710 Cost function for oscillations of one or more control inputs |
| 712 Cost function if reference state is overshot by a certain value | 714 Cost function if the control input exceeds a certain region of operation for a certain time |
| 716 Cost function for changing states | 718 Cost function for changing control inputs |
| 720 Cost function if states change quicker than a certain value | 722 Cost function if control inputs change quicker than a certain value |

FIG. 7

| Examples for controllers | Examples of control parameters |
|---|---|
| 800 PID controller | Gains |
| 802 Optimal controller | Cost function weights |
| 804 State feedback | Gains |
| 806 Dynamic output feedback | Feedback gains and observer gains |
| 808 Sliding mode control | Sliding surface and gains |
| 810 Neural network controller | Neural network weights |
| 812 $H_\infty$ Controller | Filter coefficients of pre- and post-compensator |

FIG. 8A

SYSTEM AND METHOD FOR CALIBRATING FEEDBACK CONTROLLERS

TECHNICAL FIELD

The present disclosure relates generally to control systems, and more particularly to system and method for calibrating feedback controllers.

BACKGROUND

Currently, there are various dynamic machines that can operate in unstructured and uncertain environments. Indeed, these dynamic machines are more complex in nature, in order to operate in the unstructured and uncertain environments. As the dynamic machines are complex in nature and operate in increasingly unstructured or uncertain environments, a need for automating design and calibration processes of the dynamic machines becomes more important. In particular, the control of many dynamic machines such as autonomous vehicles or robots includes various specifications that are often conflicting, and thus require considerable manual calibration efforts. Furthermore, calibration is usually done at the production stage, and it is often difficult to adjust a controller associated with the dynamic machine at a later stage, as the operating conditions of the dynamic machine change over its lifetime.

There are some currently available methods that aim to automate controller calibration and enable adapting the controller to the operation and operative conditions of the dynamic machine. However, these available methods focus on learning from a human expert or on repetitive learning tasks via a trial-and-error search. Accordingly, these available methods may only be suitable for applications that suit repetitive learning. For instance, these available methods can be used in a robot for manipulating an object. However, these available methods fail to provide controller calibration in control applications that are more continuous in nature such as autonomous driving. Furthermore, the trial-and-error search is often not suited for safety-critical machines. Also, the requirement of having a human demonstrator limits the amount of automation.

Accordingly, there is a need for a system that can automatically calibrate a controller in an efficient and feasible manner.

SUMMARY

It is objective of some embodiments to iteratively calibrate a controller in real-time and use the calibrated controller to control an operation of a machine. Examples of the machine may include a vehicle (e.g. an autonomous vehicle), a robotic assembly, a motor, an elevator door, an HVAC (Heating, Ventilating, and Air-Conditioning) system, or the like. Examples of the operation of the machine may include, but are not limited to, operating the vehicle according to a specific trajectory, operating the HVAC system according to specific parameters, operating a robot arm according to a specific task, and opening/closing elevator doors. Examples of the controller may include a PID (Proportional Integral Derivative) controller, an optimal controller, a neural network controller, or the like. Hereinafter, 'controller' and 'feedback controller' may be interchangeably used to mean the same.

In order to calibrate the feedback controller, some embodiments use a Kalman filter. But the Kalman filter is generally used in estimating state variables that define states of the machine, where the states can be physical quantities such as positions, velocities, or the like. To this end, it is an objective of some embodiments to transform or adapt the Kalman filter for estimating control parameters of the feedback controller for controlling the machine, as contrasted with the state variables of the machine. While the state variables define the state of the machine being controlled, the control parameters are used to compute control commands. Examples of the control parameters are gains of the feedback controller, such as gains in the PID controller, and/or parameters of a physical structure of the machine, like a mass of a robotic arm, or friction of a tire of a vehicle with a road. Notably, the control parameters should not be confused with variables of the control defining inputs and outputs to the control law or control policy executed by the feedback controller, such as the value of a voltage to control an actuator. In other words, input control variables are mapped to the output control variables based on control law defined by the control parameters. The mapping can be analytical or based on a solution to an optimization problem.

In many control applications, the control parameters are known in advance and are fixed, i.e., remain constant during the control. For example, the mass of the robotic arm can be measured or being known from the specification of a robot, the tire friction can be bound or selected, and the gain of a controller can be tuned in a lab. However, fixing the control parameters in advance can be suboptimal for some applications and even impractical for some other applications that instead would need to control the machine with control parameters having the uncertainty.

Some embodiments are based on the realization that the principles of tracking the state variables provided by the Kalman filter can be extended or adapted for tracking the control parameters. Indeed, while the control is not a machine, but a process, it is recognized that the control can be treated like a virtual machine with a virtual state defined by the control parameters. According to this intuition, the Kalman filter can iteratively track the control parameters if a prediction model used by the Kalman filter during a prediction stage can predict the control parameters that can explain measurements of the states of the machine according to a measurement model.

Notably, because the prediction and measurement models are provided by a designer of the Kalman filter, this flexibility allows adapting the Kalman filter for different kinds of control objectives. For example, in some embodiments, the prediction model is a constant or identity model that predicts that the control parameters would not change within a variance of the process noise. Indeed, such a prediction is common for many control applications with fixed control parameters. Additionally or alternatively, some embodiments define the prediction model that can predict at least some parameters based on their predetermined relationship with other parameters. For example, some embodiments may predict a change in tire friction based on the current velocity of the vehicle. In this configuration of the Kalman filter, the process noise controls how quickly the control parameters change over time.

In any case, such a prediction model places the main effort for tracking the control parameters on the measurement model and adds flexibility to vary the update of the measurement model based on the control objectives. Notably, such flexibility allows varying the measurement model for controlling different machines but also allows varying measurement model for different instances of time or different states during the control of the same machine.

To that end, in various embodiments, the measurement model uses a performance objective that evaluates the performance of controlling the operation of the closed-loop machine online, which is then used to adapt the control parameters to improve upon the closed-loop machine operation measured with respect to the performance objective. Notably, the performance objective has a highly flexible structure and can be different from the objective of an optimal controller. This is beneficial because the optimal control cost function has a structure that is restricted due to its real-time application, e.g., the cost function often needs to be differentiable and convex such that it is suited for numerical optimization. Besides, the performance objective can change at different times of control according to the same optimal control objective. Furthermore, the optimal control objective or other control parameters can change at different times or as a function of the state of the machine according to the same performance objective.

In such a manner, the advantages of the Kalman filter are extended to the recursive estimation of the control parameters. These advantages include that the Kalman filter (i) adapts the parameters online during machine operation, (ii) is robust to noise due to the filter-based design, (iii) maintains safety guarantees of the closed-loop operation, (iv) is computationally efficient, (v) requires reduced data storage due to the recursive implementation, and (vi) is easy to implement, hence making it appealing for industrial applications.

Some embodiments are based on the realization that in many applications several control parameters need to be tuned collectively while depending on each other. For example, the gains of a PID controller need to be tuned collectively in order to obtain a desired performance and to ensure a safe operation; the weights of a cost function for the optimal control need to be tuned collectively, because they define a trade-off between multiple and potentially conflicting objectives; and the filter coefficient that are used for an $H_\infty$ controller or a dynamic output feedback controller need to be tuned collectively to ensure performance and stability requirements.

Generally, calibrating the interdependent parameters is an even more challenging problem because this interdependency adds another variable to consider. Hence, having multiple interdependent parameters to calibrate may increase the calibration complexity. However, some embodiments are based on the realization that such interdependency of calibrated control parameters can be naturally tuned statistically by adjusting a Kalman gain placing different weights on the update of different parameters.

Some embodiments are based on the recognition that the control parameters used in the feedback controller depend on the state of the machine. Some embodiments address this state-dependence using linear combinations of basis functions, which are functions of the state of the machine. Indeed, the Kalman filter can be implemented to tune the coefficients of the basis functions, which are then used to produce the control parameters. Additionally or alternatively, some embodiments use state-dependent regions in combination with the basic functions. In each of the regions, the control parameters are computed as linear combinations of the basic functions. The Kalman filter may tune both the coefficients of the basic functions in each region as well as the regions, which decide which set of basis functions is used to compute the control parameters.

In different embodiments, the machine being controlled has linear or non-linear dynamics as well as different uncertainties of the control parameters having different bounds. Some embodiments address these variations by selecting different types of implementations of the Kalman filter and/or different variances for process and/or measurement noises.

For example, one embodiment uses an extended Kalman filter (EKF) to calculate the Kalman gain. The EKF numerically calculates a gradient of the performance objective with respect to the control parameters. The EKF is useful for problems, where the performance objective is differentiable with respect to the state of the machine, because the gradient is calculated using two gradients (i) of the performance objective with respect to the state of the machine and (ii) of the state of the dynamical machine with respect to the control parameters. The gradient of the performance objective with respect to the state of the machine is computed by the designer. The gradient of the state of the machine with respect to the control parameters is computed using the structure of the feedback controller and a model that defines dynamics of the machine.

Additionally or alternatively, one embodiment uses an unscented Kalman filter (UKF) to calculate the Kalman gain. The UKF estimates a gradient of the performance objective with respect to the control parameters using function evaluations of the performance objective. In this case, the UKF may compute sigma points, which are realizations of the control parameters. The gradient is then estimated using evaluations of the performance objective for all sigma points in combination with the joint probability distribution of the control parameters. The UKF is useful for differentiable and non-differentiable performance objectives, because it uses function evaluations to estimate the gradient.

Some embodiments are based on understanding that the online iterative update of the control parameters of the feedback controller may improve the quality of control but at expense of additional challenges. For example, the online update of the control parameters during the operation of the machine may introduce a discontinuity of control. However, some embodiments are based on the realization that such a discontinuity can be handled by forcing the control commands to satisfy the constraints on the operation of the machine. These constraints can be established by checking the control parameters to satisfy established control-theoretic properties.

Additionally or alternatively, some embodiments are based on the realization that the online update of the control parameters can destabilize the operation of the machine. For example, when the control law or the control policy is represented by a differential equation (ODE) with the control parameters, the change of the control parameters may break the stability of equilibrium of an ODE. To address this new problem potentially introduced by the Kalman filter of different embodiments, some embodiments perform a safety check, e.g., a stability check on the control policy with the values of the control parameters produced by the Kalman filter. Further, the control parameters in the control policy may be updated only when the stability check is satisfied.

For example, the stability check is satisfied when there is a Lyapunov function for the control policy with the updated control parameters. The existence of the Lyapunov function can be checked in many ways. For example, some embodiments solve an optimization problem aiming to find the Lyapunov function and/or to prove its existence. Additionally or alternatively, one embodiment checks whether the updated control parameters yield decreasing cost of the state with respect to the performance objective for the entire history of states and inputs. Additionally or alternatively, another embodiment checks whether the updated control parameters preserve a closeness of the machine to its origin. The closeness to the origin is preserved by the realization that the cost associated at the end of the prediction horizon of the control policy with the updated parameters is bounded by the ratio of maximum to minimum eigenvalue of a positive definite matrix defining, e.g., a terminal cost.

Besides, some embodiments are based on the realization that when control parameters produced by the Kalman filter fail to satisfy the safety check, the control parameters of the feedback controller should not be updated with outputs of the Kalman filter, but the Kalman filter itself should not be restarted and should continue its iteration with newly produced control parameters even though the control parameters of the Kalman filter would be different from the control parameters of the feedback controller. When during some of the next subsequent iterations the control parameters of the Kalman filter will satisfy the safety check, the safe control parameters of the Kalman filter will update the old control parameters of the feedback controller. In such a manner, the embodiments ensure the stability of the control in the presence of the online update of the control parameters.

Accordingly, one embodiment discloses a system for controlling an operation of a machine for performing a task. The system includes a transceiver configured to submit a sequence of control inputs to the machine and to receive a feedback signal including a corresponding sequence of measurements, wherein each measurement is indicative of a state of the machine caused by the corresponding control input. The system further includes a feedback controller configured to determine, at each control step, a current control input for controlling the machine based on the feedback signal including a current measurement of a current state of the machine by applying a control policy transforming the current measurement into the current control input based on current values of control parameters in a set of control parameters of the feedback controller. Furthermore, the system includes a Kalman filter configured to iteratively update a state of the feedback controller defined by the control parameters using a prediction model predicting values of the control parameters subject to process noise and a measurement model updating the predicted values of the control parameters based on the sequence of measurements subject to measurement noise to produce the current values of the control parameters that explain the sequence of measurements according to a performance objective.

Accordingly, another embodiment discloses a method for controlling an operation of a machine for performing a task. The method includes submitting a sequence of control inputs to the machine; receiving a feedback signal including a corresponding sequence of measurements, wherein each measurement is indicative of a state of the machine caused by the corresponding control input; determining, at each control step, a current control input for controlling the machine based on the feedback signal including a current measurement of a current state of the machine by applying a control policy transforming the current measurement into the current control input based on current values of control parameters in a set of control parameters of a feedback controller; and iteratively updating a state of the feedback controller defined by the control parameters using a prediction model predicting values of the control parameters subject to process noise and a measurement model updating the predicted values of the control parameters based on the sequence of measurements subject to measurement noise to produce the current values of the control parameters that explain the sequence of measurements according to a performance objective.

Accordingly, yet another embodiment discloses a non-transitory computer readable storage medium embodied thereon a program executable by a processor for performing a method for controlling an operation of a machine for performing a task. The method includes submitting a sequence of control inputs to the machine; receiving a feedback signal including a corresponding sequence of measurements, wherein each measurement is indicative of a state of the machine caused by the corresponding control input; determining, at each control step, a current control input for controlling the machine based on the feedback signal including a current measurement of a current state of the machine by applying a control policy transforming the current measurement into the current control input based on current values of control parameters in a set of control parameters of a feedback controller; and iteratively updating a state of the feedback controller defined by the control parameters using a prediction model predicting values of the control parameters subject to process noise and a measurement model updating the predicted values of the control parameters based on the sequence of measurements subject to measurement noise to produce the current values of the control parameters that explain the sequence of measurements according to a performance objective.

BRIEF DESCRIPTION OF THE DRAWINGS

FIG. 2E illustrates an evolution of a state of the machine over a time, according to some embodiments of the present disclosure.

FIG. 7 illustrates a list of performance objectives used by the Kalman filter, according to some embodiments of the present disclosure.

FIG. 8A illustrates a list of feedback controllers used in the system, according to some embodiments of the present disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1:
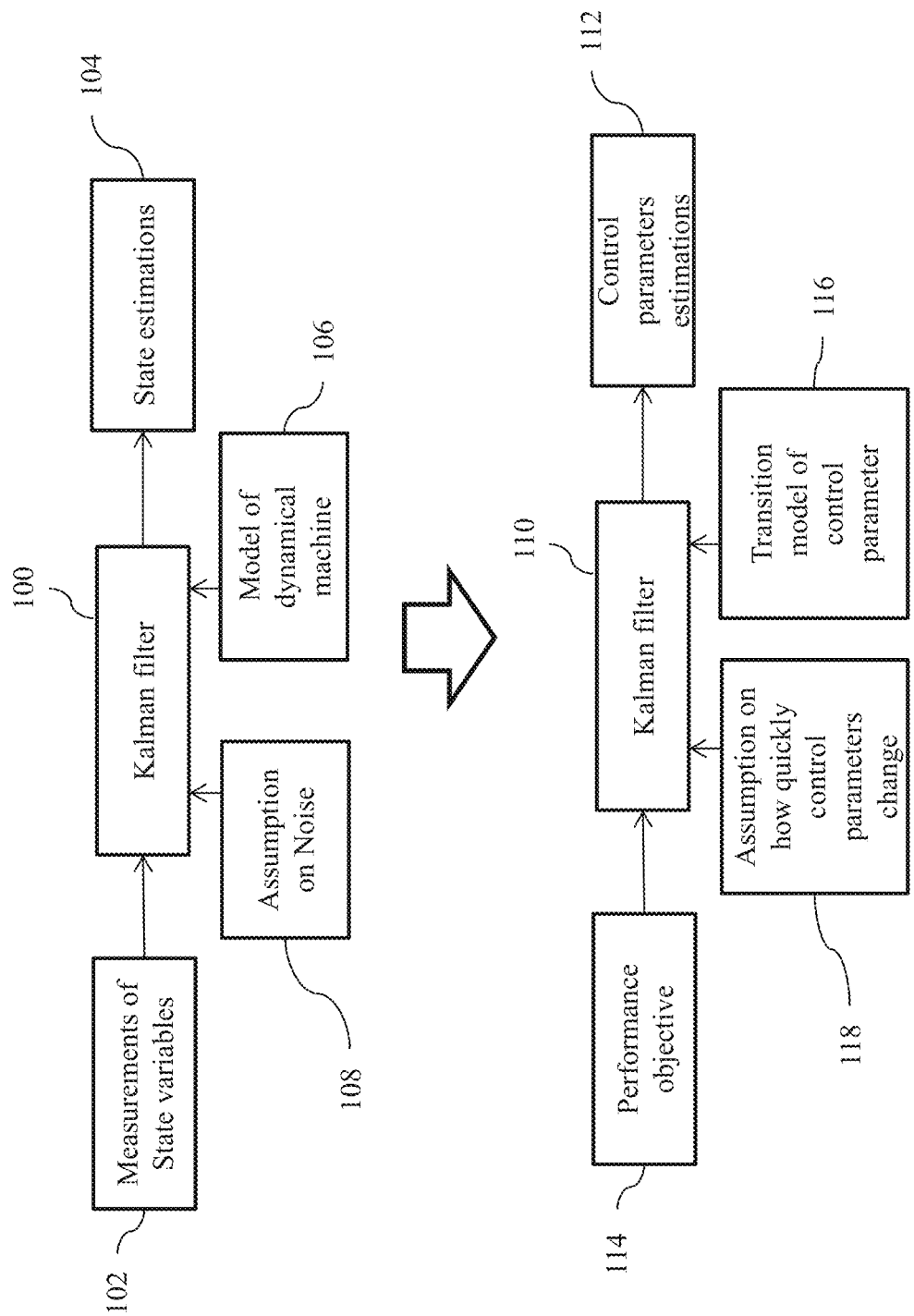
FIG. 1 illustrates an overview of principles of a Kalman filter, according to some embodiments of the present disclosure.

FIG. 1 illustrates an overview of principles of a Kalman filter, according to some embodiments of the present disclosure. A Kalman filter 100 is a process (or a method) that produces estimates of unknown variables using a series of measurements observed over a time period, containing statistical noise and other inaccuracies. Indeed, these produced estimates of the unknown variables may be more accurate than an estimate of an unknown variable produced using a single measurement. The Kalman filter 100 produces the estimates of the unknown variables by estimating a joint probability distribution over the unknown variables.

In an exemplary scenario, the series of measurements used by the Kalman filter 100 can be measurements 102 associated with state variables of a dynamical machine. Accordingly, in this exemplary scenario, the Kalman filter 100 may be used in producing state estimations 104 of the dynamical machine. As used herein, the state variable may be a variable that mathematically describes a 'state' of the dynamical machine. A state of the dynamical machine describes enough about the dynamical machine to determine its future behavior (e.g. motion) in absence of any external forces affecting the dynamical machine. For instance, the state estimations 104 can be estimations of physical quantities such as velocities, positions, and/or the like. Indeed, these state estimations 104 are required in applications such as navigation guidance, and control of vehicles, particularly aircraft, spacecraft, and dynamically positioned ship.

The Kalman filter 100 is a two-step process, which includes a predicting step and an updating step. In predicting step, the Kalman filter 100 uses a prediction model to predict the current states along with their uncertainties governed by a process noise. For instance, the prediction model may be artificially designed such that the prediction model is subjected to the process noise (e.g. an assumption 108) for reducing the uncertainties in the states, while predicting the current states. Indeed, the predicted current states may be represented by the joint probability distribution over the current states. In some example embodiments, the prediction model may use a model 106 of the dynamical machine to predict the current states. As used herein, the model 106 of the dynamical machine may be mathematical expressions that relate the states of the dynamical machine to (i) previous states of the dynamical machine and (ii) control inputs to the dynamical machine. An example of the model 106 is as below.

$$x_{k+1} = f(x_k, u_k) + w_k,$$

where $x_k$ is a vector or scalar that includes all states of the dynamical machine, $u_k$ is a vector or scalar that includes all control inputs to the dynamical machine, f is a nonlinear function model of the dynamical machine, and $w_k$ accounts for a mismatch between the dynamical machine and the model 106.

In updating step, once an outcome of next measurement (necessarily corrupted with some amount of error, including random noise) is observed, the predicted states are updated according to a measurement model subject to a measurement noise. The measurement noise may control the error in the measurement. The measurement noise may also be included in the assumption 108. The measurement model may be designed such that the measurement model aims to reconcile the predictions with the measurements. For example, the measurement model may update the joint probability distribution over the current states using a weighted average, with more weight being given to estimates with higher certainty.

The output of the Kalman filter 100 may be the state estimations 104 that maximize the likelihood of the received measurements 102 of the states given the assumption 108 on noise (e.g. the process noise and the measurement noise) and the model 106 of the dynamical machine. For instance, the assumption 108 on noise may include mathematical noise models that aim to reduce the inaccuracies in the states and in the measurements. The Kalman filter 100 is a recursive process, which can run in real-time, using only the present measurements and the previously calculated state and its uncertainty matrix; no additional past information is necessary.

Some embodiments are based on the realization that the principles provided by the Kalman filter 100 for estimating the states of the dynamical machine can be extended or adapted for estimating virtual states of a virtual machine. In other words, the Kalman filter 100 that estimates the states of the dynamical machine can be extended to a Kalman filter 110 that estimates the virtual states of the virtual machine. Notably, because the prediction and the measurement models are provided by a designer of the Kalman filter 100, this flexibility allows adapting or extending the Kalman filter 100 to the Kalman filter 110.

In many control applications, control parameters that define state(s) of a controller may be known in advance and are fixed, i.e., remain constant during a control of the dynamic machine. Examples of the control parameters include gains of the controller, such as gains in a PID controller, and/or parameters of a physical structure of the dynamical machine, like a mass of a robotic arm, or friction of a tire of a vehicle with the road. For example, the mass of the robotic arm can be measured or may be known from the specification of a robot, the tire friction can be bound or selected, and the gain of a controller can be tuned in a lab. However, fixing the control parameters in advance can be suboptimal for some applications and even impractical for some other applications that instead would need to control the dynamical machine with control parameters having the uncertainty.

To this end, it is an objective of some embodiments to extend or adapt the Kalman 100 to the Kalman filter 110 that estimates control parameters 112 defining the state(s) of the controller. In these embodiments, the virtual states are the state(s) defined by the control parameters and the virtual machine is the controller. In order to extend the Kalman filter 100 to the Kalman filter 110, in the predicting step, the prediction model subjected to the process noise may be adapted to predict the control parameters using a transition model 116 of the control parameters 112. The process noise in the Kalman filter 110 may control how quickly the control parameters change over a time rather than controlling the inaccuracies in the states. Accordingly, an assumption 118 may be designed. Further, the transition model 116 may also be artificially designed.

In the updating step, the measurement model subject to the measurement noise may be adapted to evaluate a performance of the predicted control parameters in controlling of the dynamical machine, based on a performance objective 114. Further, the measurement model may be adapted to update the predicted control parameters based on the evaluation. Notably, the performance objective 114 has a highly flexible structure and can be different from an objective of the controller.

Thereby, the Kalman filter 110 may estimate the control parameters 112 based on the assumption 118 on how quickly the control parameters change in the presence of the error from the performance objective 114. Indeed, the output of the Kalman filter 110 is the control parameter estimations 112 that maximize the likelihood of the received performance objective 114 given (i) the assumption 118 and (ii) the transition model 116. For instance, a control system that uses the principles of the Kalman filter 110 is as explained in the detailed description of FIG. 2A.

Figure 2A:
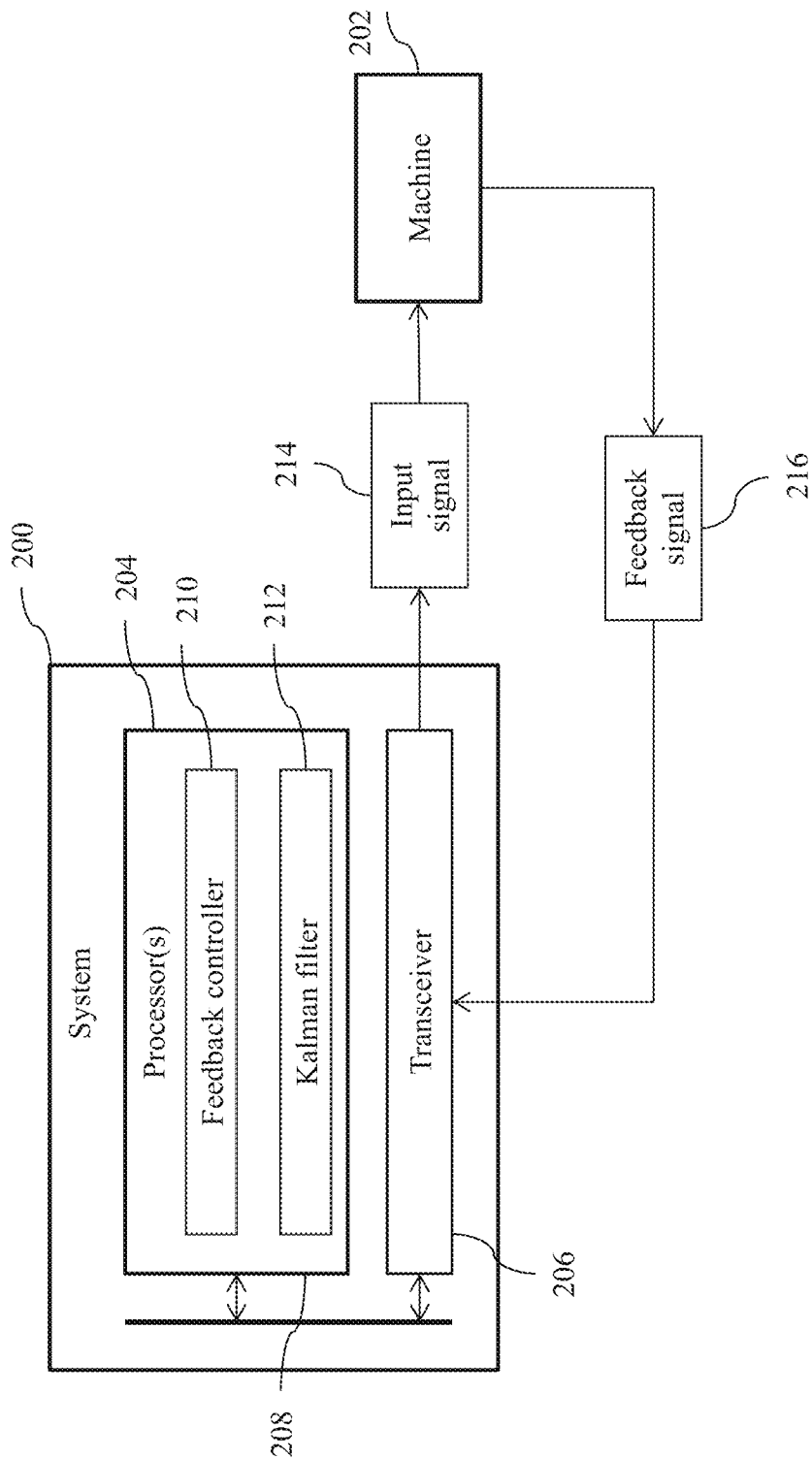
FIG. 2A illustrates a block diagram of a control system for controlling an operation of a dynamical machine, according to some embodiments of the present disclosure.

FIG. 2A illustrates a block diagram of a control system 200 for controlling an operation of a dynamical machine 202, according to some embodiments of the present disclosure. Some embodiments are based on the recognition that an objective of the control system 200 is to control the dynamical machine 202 in engineered processes. To this end, the control system 200 may be operatively coupled to the dynamical machine 202. Hereinafter, 'control system' and 'system' may be interchangeably used to mean the same. Hereinafter, 'dynamical machine' and 'machine' may be interchangeably used to mean the same. Examples of the machine 202 may include a vehicle (e.g. an autonomous vehicle), a robotic assembly, a motor, an elevator door, a HVAC (Heating, Ventilating, and Air-Conditioning) system, or the like. For example, the vehicle can be self-driving car, aircraft, spacecraft, dynamically positioned ships, or the like. Examples of the operation of the machine 202 may include, but are not limited to, operating the vehicle according to a specific trajectory, operating the HVAC system according to specific parameters, operating a robot arm according to a specific task, and opening/closing elevator doors.

The system 200 may include at least one processor 204, a transceiver 206, and a bus 208. Additionally, the system 200 may include a memory. The memory may be embodied as a storage media such as RAM (Random Access Memory), ROM (Read Only Memory), hard disk, or any combinations thereof. For instance, the memory may store instructions that are executable by the at least one processor 204. The at least one processor 204 may be embodied as a single core processor, a multi-core processor, a computing cluster, or any number of other configurations. The at least one processor 204 may be operatively connected to the memory and/or the transceiver 206 via the bus 208. According to an embodiment, the at least one processor 204 may be configured as a feedback controller 210 and/or a Kalman filter 212. Accordingly, the feedback controller 210 and the Kalman filter 212 may be embodied within the single core processor, the multi-core processor, the computing cluster, or any number of other configurations. Alternatively, the feedback controller 210 may be embodied outside the system 200 and may be in communication with the system 200. In this configuration, the system 100 may be operatively coupled to the feedback controller 210, which in-turn may be coupled to the machine 202. For example, the feedback controller 210 may be, but are not limited to, a PID (Proportional Integral Derivative) controller, an optimal controller, a neural network controller, or the like.

According to an embodiment, the feedback controller 210 may be configured to determine a sequence of control inputs to control the machine 202. For example, the control inputs may be possibly associated with physical quantities such as voltages, pressures, forces, torques, or the like. In an example embodiment, the feedback controller 210 may determine the sequence of control inputs such that the sequence of the control inputs change states of the machine 202 in order to perform a specific task, e.g., tracking a reference. Once the sequence of control inputs is determined, the transceiver 206 may be configured to submit the sequence of control inputs as an input signal 214. As a result, the states of the machine 202 may be changed according to the input signal 214 to perform the specific task. For instance, the transceiver 206 may be a RF (Radio Frequency) transceiver, or the like.

Further, the states of the machine 202 may be measured using one or more sensors installed in the machine 202. The one or more sensors may send a feedback signal 216 to the transceiver 206. The transceiver 206 may receive the feedback signal 216. In an example embodiment, the feedback signal 216 may include a sequence of measurements corresponding to the sequence of the control inputs respectively. For instance, the sequence of measurements may be measurements of the states outputted by the machine 202 in accordance to the sequence of the control inputs. Accordingly, each measurement in the sequence of measurements may be indicative of a state of the machine 202 caused by a corresponding control input. Each measurement in the sequence of measurements may be possibly associated with the physical quantities such as currents, flows, velocities, positions, and/or the like. In this way, the system 200 may iteratively submit the sequence of control inputs and receive the feedback signals. In an example embodiment, in order to determine the sequence of control inputs in a current iteration, the system 200 uses the feedback signal 216 that includes the sequence of measurements indicating current states of the machine 202.

In order to determine the sequence of control inputs in the current iteration, the feedback controller 210 may be configured to determine, at each control step, a current control input for controlling the machine 202 based on the feedback signal 216 including a current measurement of a current state of the machine. According to an embodiment, to determine the current control input, the feedback controller 210 may be configured to apply a control policy. As used herein, the control policy may be a set of mathematical equations that map all or a subset of states of the machine 202 to the control inputs. The mapping can be analytical or based on a solution to an optimization problem. In response to applying the control policy, the current measurement of the current state may be transformed into the current control input, based on current values of the control parameters in a set of control parameters of the feedback controller 210. As used herein, the control parameters may be (i) gains of the feedback controller 210 and/or (ii) parameters of the physical structure of the machine 202. For example, when the feedback controller 210 corresponds to the PID controller, then the set of control parameters includes a proportional gain, an integral gain, and a derivative gain of the PID controller. For example, the parameters of the physical structure of the machine 202 may include a mass of a robotic arm, or a friction of a tire of a vehicle with the road. Notably, the control parameters should not be confused with the control inputs, which are outputs of the control policy. According to an embodiment, the current values of the control parameters may be produced by the Kalman filter 212. For instance, the Kalman filter 212 that produces the control parameters is as explained in the detailed description of FIG. 2B.

Figure 2B:
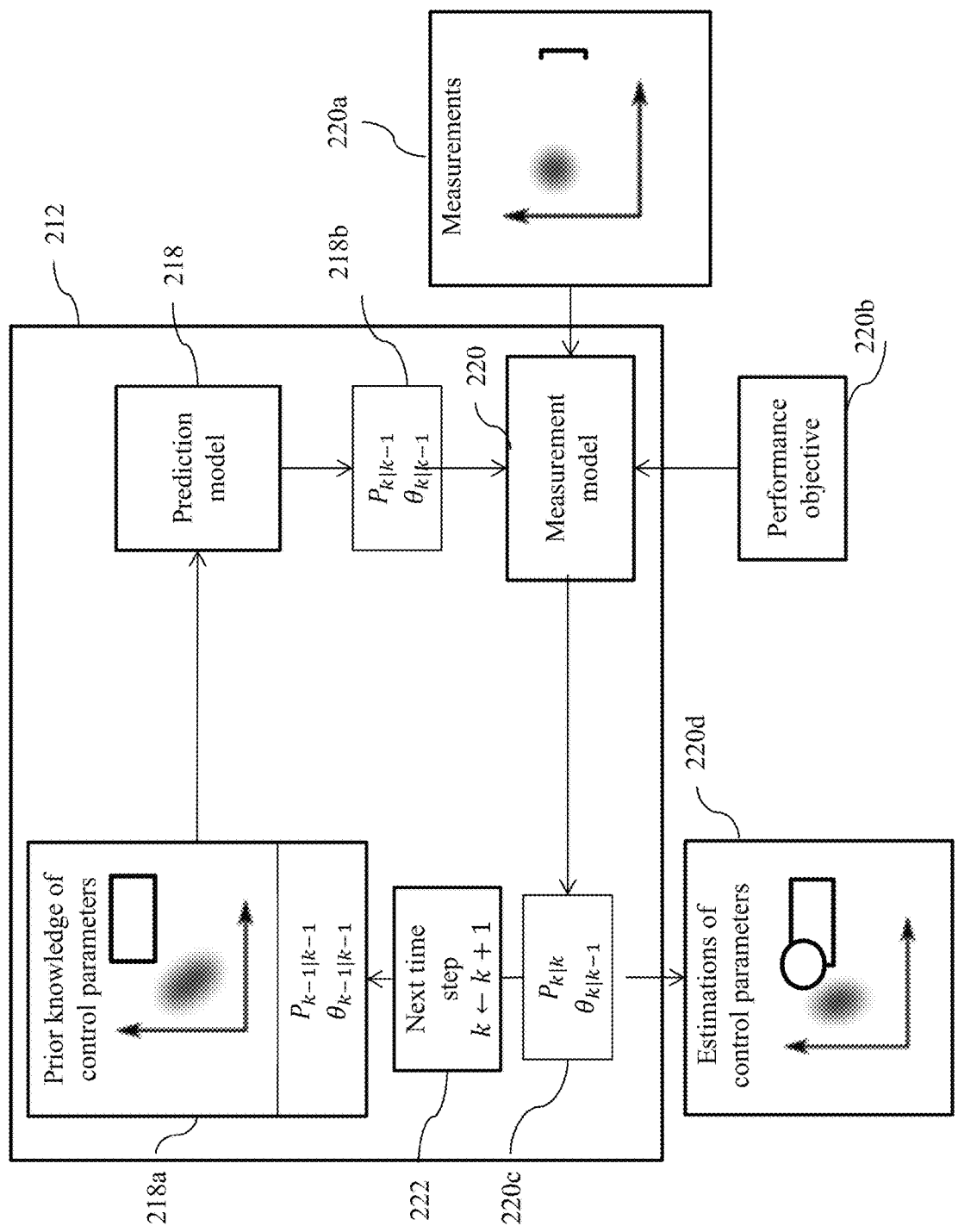
FIG. 2B illustrates the Kalman filter for producing control parameters, according to some embodiments of the present disclosure.

FIG. 2B illustrates the Kalman filter 212 for producing the control parameters, according to some embodiments of the present disclosure. FIG. 2B is explained in conjunction with FIG. 2A. According to an embodiment, the Kalman filter 212 may be configured to iteratively update the state of the feedback controller 210. According to an embodiment, the state of the feedback controller 212 is defined by the control parameters. To this end, it is an objective of the Kalman filter 212 to iteratively produce the control parameters. In an example embodiment, the Kalman filter 212 may iteratively produce the control parameters, using a prediction model 218 and a measurement model 220. For instance, the prediction model 218 and the measurement model 220 may be artificially designed.

In order to produce the control parameters in a current iteration (e.g., at a time step k), the prediction model 218 may be configured to predict values of the control parameters using a prior knowledge 218a of the control parameters. For instance, the prior knowledge 218a of the control parameters may be produced at a pervious iteration (e.g., at a time step k−1). The prior knowledge 218a of the control parameters may be a joint probability distribution (or a Gaussian distribution) over the control parameters at the pervious iteration. The joint probability distribution over the control parameters at the pervious iteration can be defined by a mean, $\theta_{k-1|k-1}$, and a variance (or a covariance), $P_{k-1|k-1}$, computed at the previous iteration. For instance, the joint probability distribution at the previous iteration may be produced based on a joint probability distribution that was produced in a past previous iteration (e.g. at time step k−2) and/or a model (e.g. the transition model 116) of the feedback controller 210.

According to an embodiment, the values of the control parameter predicted in the current iteration may also be a joint probability distribution 218b (or a Gaussian distribution 218b). For instance, the output of the prediction model 218 may be the joint probability distribution 218b, when the prediction model 218 is configured to predict multiple control parameters. Alternatively, the output of the prediction model 218 may be the Gaussian distribution 218b, when the prediction model 218 is configured to predict a single control parameter. For instance, the joint probability distribution 218a may be defined by a mean, $\theta_{k|k-1}$, and a variance (or a covariance) $P_{k|k-1}$, computed in the current iteration. For example, while predicting the single control parameter, the Gaussian distribution outputted by the prediction model 218 is as shown in FIG. 2C.

Figure 2C:
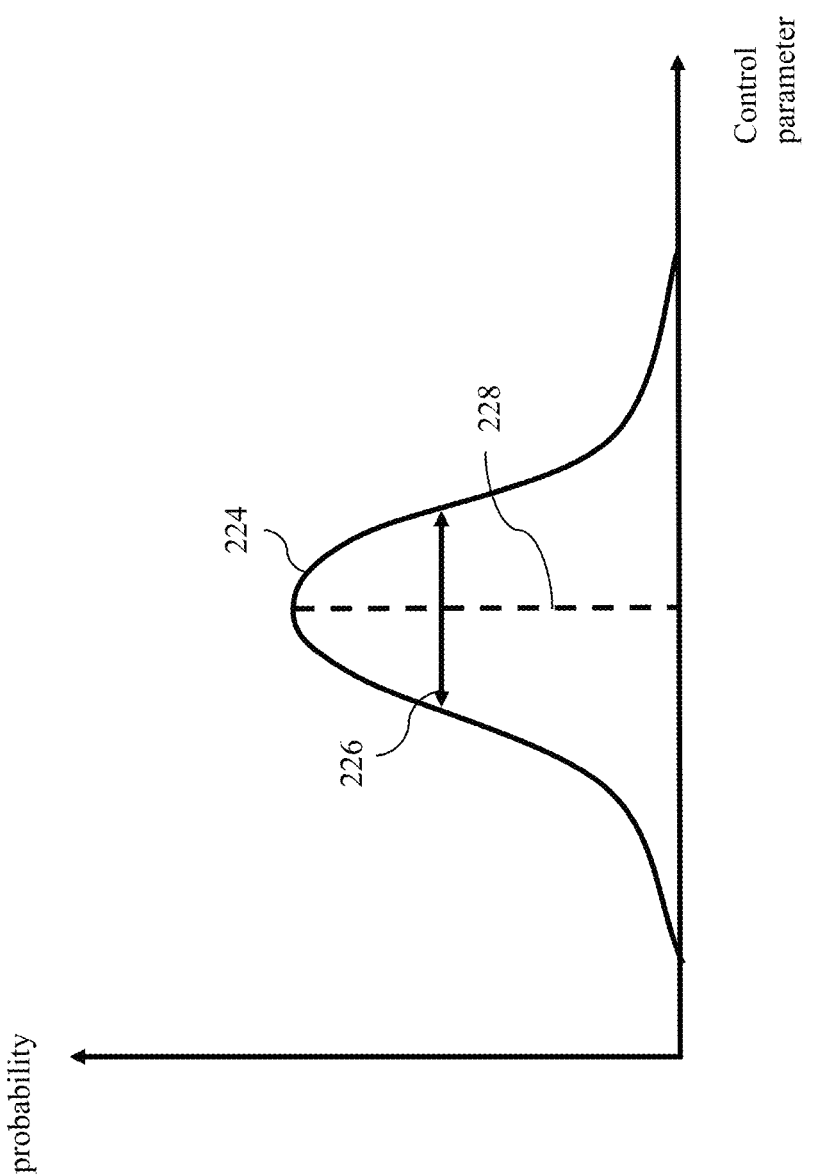
FIG. 2C illustrates a Gaussian distribution representing one particular control parameter, according to some embodiments of the present disclosure.

FIG. 2C illustrates a Gaussian distribution 224 representing one particular control parameter, according to some embodiments of the present disclosure. FIG. 2C is explained in conjunction with FIG. 2B. The Gaussian distribution 224 may be predicted by the prediction model 218. For instance, the Gaussian distribution 224 may correspond to the Gaussian distribution 218b. The Gaussian distribution 224 may be defined by a mean 226 (e.g. the mean, $\theta_{k|k-1}$) and a variance 228 (e.g. the variance $P_{k|k-1}$), where the mean 226 defines a center position of the Gaussian distribution 224 and the variance 228 defines a measurement of a spread (or a width) of the Gaussian distribution 224.

Referring back to FIG. 2B, according to an embodiment, the prediction model 218 may be subjected to a process noise. As used herein, the process noise may be an assumption (e.g. the assumption 118) that defines how quickly the control parameters change over a time. The process noise may control how quickly the control parameters change over the time within a variance defined by the process noise. The process noise may be artificially designed. For example, when the prediction model 218 is subjected to process noise, then the prediction model 218 may output multiple Gaussian distributions for one particular control parameter, where the multiple Gaussian distributions may have different variances defined within the variance of the process noise. For instance, the multiple Gaussian distributions outputted by the prediction model 218 for one particular control parameter is as shown in FIG. 2D.

Figure 2D:
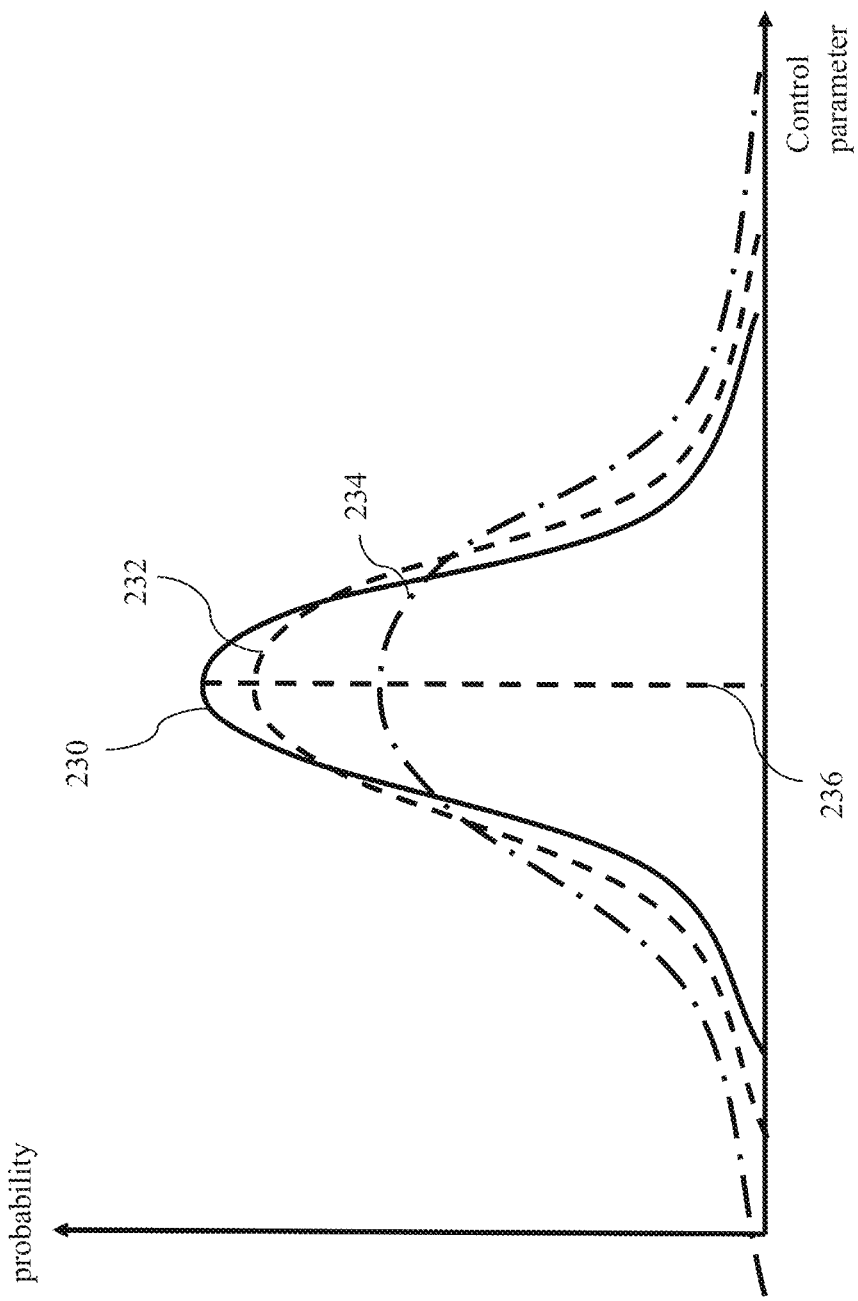
FIG. 2D illustrates Gaussian distributions with different variances, according to some embodiments of the present disclosure.

FIG. 2D illustrates Gaussian distributions 230, 232, and 234 with different variances, according to some embodiments of the present disclosure. FIG. 2D is explained in conjunction with FIG. 2B. The Gaussian distributions 230, 232, and 234 may be predicted by the prediction model 218. Each of these Gaussian distributions 230, 232, and 234 may have a different variance with respect to each other, but a mean 236 of the Gaussian distributions 230, 232, and 234 may be constant. A Gaussian distribution with (i) a small variance and (ii) the mean 236 having a highest probability among other Gaussian distributions may be a correct prediction of the control parameter. For instance, the Gaussian distribution 230 may represent the correct prediction of the control parameter.

Referring back to FIG. 2B, in this way, the prediction model 218 subject to the process noise may be configured to predict the values of the control parameters that are outputted as the joint probability distribution 218b (or the Gaussian distribution 218b). Once the joint probability distribution 218b is outputted by the prediction model 218 in the current iteration, the measurement model 220 may be configured to update, based on a sequence of measurements 220a, the predicted values of the control parameters to produce the current values of the control parameters. In an example embodiment, the sequence of measurements 220a may be the sequence of measurements received by the transceiver 206. For instance, the sequence of measurements 220a used by the measurement model 220 is as shown in FIG. 2E.

FIG. 2E illustrates an evolution 238 of the state of the machine 202 over the time, according to some embodiments of the present disclosure. FIG. 2E is explained in conjunction with FIG. 2A and FIG. 2B. For instance, the evolution 238 of the state of the machine 202 may be obtained from the one or more sensors installed in the machine 202. For instance, if a current time is $t_0$, the measurement model 220 may use N state measurements 240 to update the predicted values of the control parameters. The N state measurements 240 may correspond to the sequence of measurements 220a. The N state measurements 240 may include measurements which start from a measurement, $x_{t_{-N}}$, associated with a past time $t_{-N}$ and end with a measurement, $x_{t_0}$, associated with a current time $t_0$. Here, in FIG. 2E, the measurement model 220 using N state measurements 240 for only one state is considered. However, when the machine 202 is associated with more than one state, then the measurement model 220 may use N measurements of all states within the same time frame.

Referring back to FIG. 2B, some embodiments are based on the recognition that the sequence of measurements 220a obtained from the one or more sensors may not be accurate, due to defects in sensors, other noises (e.g. a random noise), or the like. To this end, the measurement model 220 may be subject to a measurement noise. As used herein, the measurement noise is a noise model that can be used to reduce the inaccuracies in the measurements 220a caused due to the defects in the sensors, other noises, or the like. For instance, the measurement noise can be artificially designed.

In an example embodiment, the measurement model 220 subject to the measurement noise may be configured to update the predicted values of the control parameters, based on the sequence of measurements 220a. In order to update the predicted values, the measurement model 220 may be configured to compute a model mismatch between the sequence of the measurements 220a and the model (e.g. the model 106) of the machine 202. Further, the measurement model 220 may be configured to simulate an evolution (for instance, measurements of the states) of the machine 202, using the predicted control values, the model of the machine 202, and the computed model mismatch. For instance, the simulated evolution (i.e. the measurements of the states) may be similar to the sequence of measurements 220a. Furthermore, the measurement model 220 may be configured to evaluate, according to a performance objective 220b, the simulated evolution of the machine 202 to produce the current values of the control parameters. Since the current values of the control parameters are produced based on the evaluation of the simulated evolution that may be similar to the sequence of measurements 220a, the current values of the control parameters can explain the sequence of measurements 220a. For instance, the measurement model 220 updating the predicted values of the control parameters is graphically illustrated in FIG. 2F.

Figure 2F:
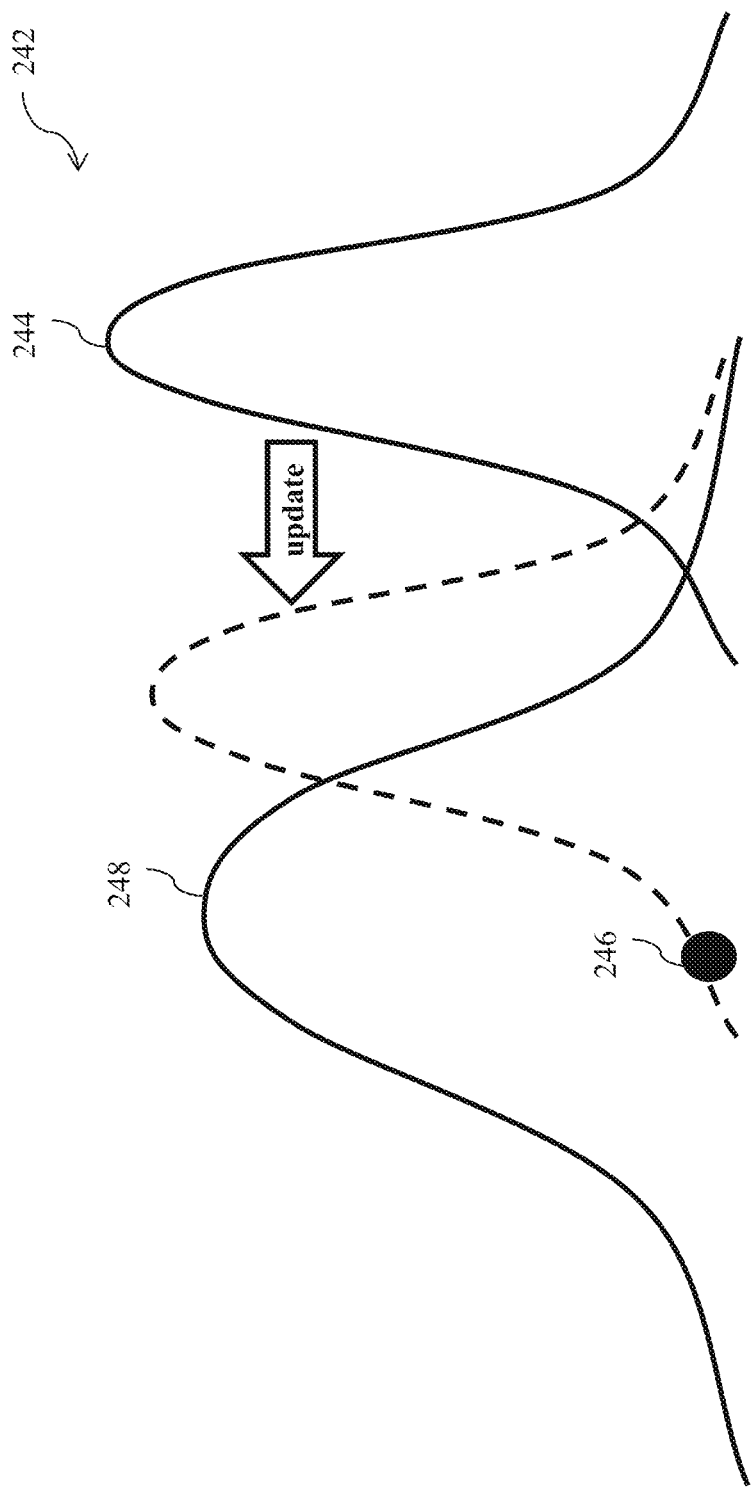
FIG. 2F illustrates a schematic for updating predicted values of the control parameters, according to some embodiments of the present disclosure.

FIG. 2F illustrates a schematic 242 for updating the predicted values of the control parameters, according to some embodiments of the present disclosure. FIG. 2F is explained in conjunction with FIG. 2B. The schematic 242 includes a predicted Gaussian distribution 244, a control parameter 246 (or a value of a control parameter), and an updated Gaussian distribution 248. For instance, the predicted Gaussian distribution 244 may be the Gaussian distribution 218b defined by the mean, $\theta_{k|k-1}$, and the variance, $P_{k|k-1}$. For instance, the control parameter 246 may be a control parameter that can be used to control the machine 202 in order to achieve the specific trajectory, with respect to the performance objective 220b. Further, the control parameter 246 may be originated from the predicted Gaussian distribution 244, for which a measurement is close to zero probability with the predicted Gaussian distribution 244. To this end, the measurement model 220 may update the predicted Gaussian distribution 244 such that the predicted Gaussian distribution 244 moves closer to the updated Gaussian distribution 248. In other words, the measurement model 220 may update the mean and the variance associated with the predicted Gaussian distribution 244 to a mean (e.g. a mean $\theta_{k|k}$) and a variance (e.g. a variance $P_{k|k}$) corresponding to updated Gaussian distribution 248.

Referring back to FIG. 2B, in this way, the measurement model 220 may update, based on the sequence of measurements 220a, the predicted values of the control parameters to produce the current values of the control parameters according to the performance objective 220b. In an example embodiment, the performance objective 220b may be different from the control policy of the feedback controller 210 that is used for determining the control inputs. This is beneficial because the control policy has a structure that is restricted due to its real-time application, e.g., cost function often needs to be differentiable and convex such that the cost function can be suited for numerical optimization. However, the performance objective 220b can change at different times of control according to the same control policy.

According to an embodiment, the measurement model 220 may output the produced current values of the control parameters as a joint probability distribution 220d (or a Gaussian distribution 220d), which are defined the quantities 220c, for example, the mean, $\theta_{k|k}$, and the variance, $P_{k|k}$. The Kalman filter 212 may repeat the procedure to produce the control parameters in a next iteration 222 (e.g., at a time step k+1).

In this way, the Kalman filter 212 may iteratively produce the control parameters, which can be used to iteratively update the state of the feedback controller 210. The updated state of the feedback controller 210 may be in-turn used to determine the control inputs for controlling the operation of the machine 202. Since the Kalman filter 212 iteratively produces the control parameters using the joint probability distribution (e.g. the prior knowledge 218a) of the control parameters rather than re-computing the control parameters using entire data history, accordingly the Kalman filter 212 may efficiently produce the control parameters for controlling the operation of the machine 202. Further, data to be stored in the memory of the system 200 may also be reduced, because the system 200 may need to store only the prior knowledge of the control parameters rather than the entire data history. Accordingly, the memory requirements for the system 200 can be reduced.

Some embodiments are based on the realization that the Kalman filter 212 should collectively calibrate the control parameters, when one or more control parameters of the control parameters depend on another control parameter(s) of the same control parameters. For example, in the PID controller, the gains should be collectively calibrated, because the gains of the PID controller are interdependent on each other.

Generally, calibrating these interdependent control parameters may be challenging, because the interdependency may add additional variable(s) while calibrating. In such a situation, the Kalman filter 212 may be configured as explained in the detailed description of FIG. 3.

Figure 3:
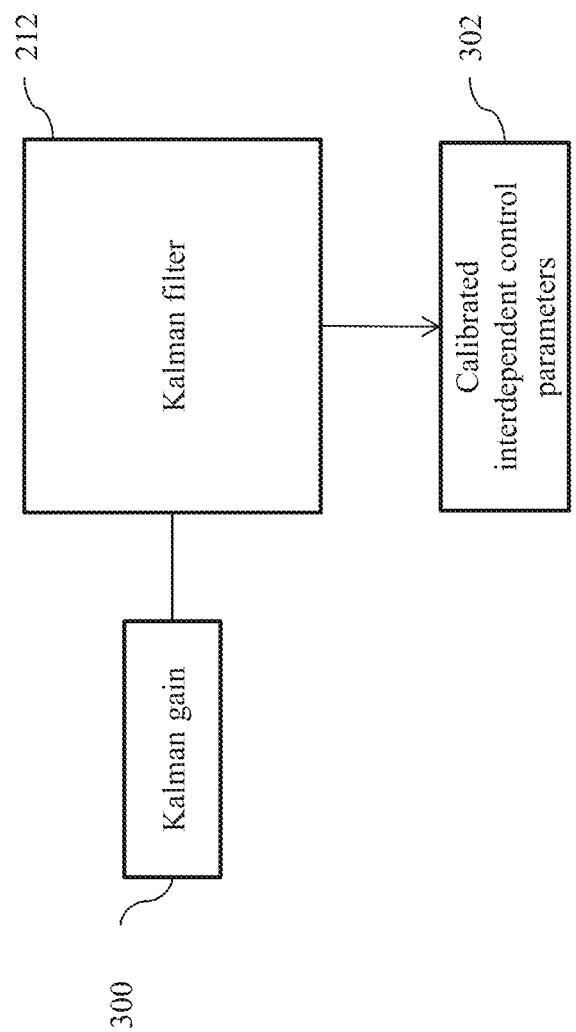
FIG. 3 illustrates a block diagram of the Kalman filter for calibrating multiple interdependent control parameters, according to some embodiments of the present disclosure.

FIG. 3 illustrates a block diagram of the Kalman filter 212 for calibrating multiple interdependent control parameters, according to some embodiments of the present disclosure. FIG. 3 is explained in conjunction with FIG. 2B. According to an embodiment, when the control parameters correspond to the multiple interdependent control parameters, the Kalman filter 212 may be configured to adjust a Kalman gain 300 for calibrating the control parameters. For instance, the control parameters may be referred to as the multiple interdependent control parameters, if the control parameters include one or more control parameters that are dependent on other control parameter(s) of the same control parameters. As used herein, 'adjust the Kalman gain 300' may be indicative of placing different weights on the control parameters. In order to calibrate the multiple interdependent control parameters, the Kalman filter 212 may adjust the Kalman gain 300 such that the one or more control parameters that are dependent on the other control parameter(s) may be placed with more weights relative to the other control parameters. Further, the Kalman filter 212 may be configured to simultaneously update the control parameters using the measurement model 220 for outputting calibrated interdependent control parameters 302. For instance, the Kalman filter 212 may compute the Kalman gain 300 as explained in the detailed description of FIG. 4A and/or FIG. 4B.

Figure 4A:
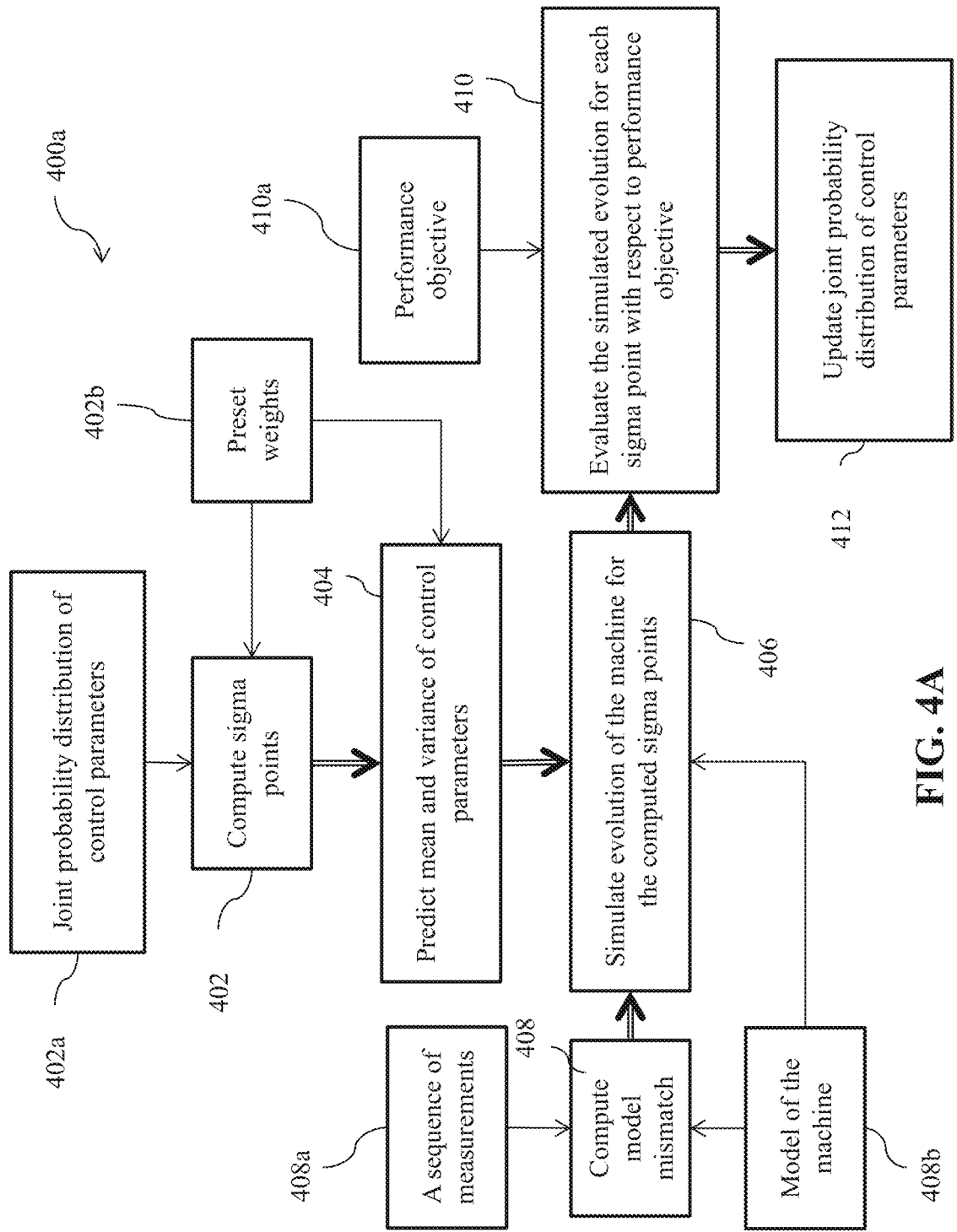
FIG. 4A illustrates a method executed by the Kalman filter, according to some embodiments of the present disclosure.

FIG. 4A illustrates a method 400a executed by the Kalman filter 212, according to some embodiments of the present disclosure. FIG. 4A is explained in conjunction with FIG. 2B. The Kalman filter 212 may execute the method 400a, when the Kalman filter 212 corresponds to an Unscented Kalman filter (UKF). At step 402, the Kalman filter 212 may be configured to compute sigma points using a joint probability distribution 402a over the control parameters and a set of preset weights 402b. For instance, the joint probability distribution 402a may be the prior knowledge 218a of the control parameters that is defined by the mean, $\theta_{k-1}$, and the variance, $P_{k-1|k-1}$. The set of preset weights 402b may be weights, $w^{c,i}$ and $w^{a,i}$, which are selected by a designer of the Kalman filter 212. For example, the sigma points may be mathematically computed using Equation (1).

$$\theta^i = \theta_{k-1} \pm \sqrt{\frac{L}{1-w^{a,0}}} A_i, \quad \text{Equation (1)}$$

where the notation L is a number of the control parameters and the notation $A_i$ is the i-th column of a matrix A. The matrix A may be computed from the variance, $P_{k-1|k-1} = AA^T$, using a Cholesky decomposition. In an example embodiment, these computed sigma points may be the realizations of the control parameters. Additionally, at step 402, the Kalman filter 212 may compute a mean of the sigma points. For example, the mean of the sigma points may be mathematically computed using Equation (2).

$$\hat{\theta} = \Sigma_{i=0}^{2L} w^{a,i} \theta^i \quad \text{Equation (2).}$$

At step 404, the Kalman filter 212 may predict the mean and the variance of the control parameters using the prediction model 218. For example, the mean and the variance of the control parameters may be mathematically predicted using Equations (3a) and (3b) respectively.

$$\theta_{k|k-1} = \theta_{k-1} \quad \text{Equation (3a)}$$

$$P_{k|k-1} = C_\theta + \Sigma_{i=0}^{2L} w^{c,i} (\theta^i - \hat{\theta})(\theta^i - \hat{\theta})^T \quad \text{Equation (3b)}$$

where the notation $C_\theta$ is a variance matrix of the process noise.

At step 406, the Kalman filter 212 may simulate the evolution of the machine (e.g. the machine 202) for the computed sigma points. In order to simulate the evolution of the machine, the Kalman filter 212, at step 408, may compute the model mismatch using a sequence of measurements 408a and a model 408b of the machine. For instance, the sequence of measurements 408a may correspond to the measurements 220a. For instance, the model 408b of the machine may be the model 106 (explained in FIG. 1). For example, the model mismatch may be mathematically computed using Equation (4).

$$w_k = x_{k+1} - f(x_k, u_k) \forall k = t_{-N}, \ldots, 0 \quad \text{Equation (4)}$$

Further, the Kalman filter 212, at step 406, may simulate the evolution of the machine for the computed sigma points using the computed model mismatch and the model 408 of the machine. For instance, the evolution of the machine may be a hypothetical evolution of the machine that would have resulted if the machine were controlled with the control parameters defined by the computed sigma points. For example, the evolution of the machine may be mathematically simulated using Equation (6).

$$\hat{x}_{k+1}^i = f(\hat{x}_k^i, u_k) + w_k, u_k = \kappa_{\theta^i}(\hat{x}_k^i) \forall k = t_{-N}, \ldots, 0, \quad \text{Equation (6)}$$

$$\hat{x}_{t_{-N}}^i = x_{t_{-N}}$$

where the notation $\kappa_{\theta^i}$ is the control policy (or a control law) defined by the control parameters $\theta^i$, the notation $w_k$ is the model mismatch, the notation $x_{t_{-N}}$ denotes the state of the machine at time $t_{-N}$, and the notation $\hat{x}_k^i$ with $k = t_{-N}, \ldots, 0$ denotes a hypothetical state evolution for the realization of the control parameters defined the sigma points.

At step 410, the Kalman filter 212 may evaluate the simulated evolution for each sigma point with respect to a performance objective 410a. For instance, the performance objective 410a may be the performance objective 220b. For example, the evaluation for each sigma point with respect to the performance objective 410a may be mathematically performed using Equation (7).

$$y^i = h(\theta^i) \forall i = 0, \ldots, 2L \quad \text{Equation (7)}$$

where the function 'h' may be the performance objective 410a.

The Kalman filter 212, at step 410, may further compute a weighted mean for the evaluation results. For example, the weighted mean for the evaluation results may be mathematically computed using Equation (8).

$$\hat{y} = \Sigma_{i=0}^{2L} w^{a,i} y^i \quad \text{Equation (8).}$$

Furthermore, at step 410, the Kalman filter 212 may compute a Kalman gain using the evaluation results and the weighted mean of the evaluation results. For example, the Kalman gain may be mathematically computed using Equation (9).

$$K_k = C_{\theta y, k} S_k^{-1} \quad \text{Equation (9)}$$

where the notation $S_k = C_v + \Sigma_{i=0}^{2L} w^{c,i} (y^i - \hat{y})(y^i - \hat{y})^T$, and the notation $C_{\theta y,k} = \Sigma_{i=0}^{2L} w^{c,i} (\theta^i - \hat{\theta})(y^i - \hat{y})^T$. The notation $C_v$ is the measurement noise. In some embodiments, the Kalman gain $K_k$ may be adjusted by modifying the preset weight parameter, $w^{c,i}$.

At step 412, the Kalman filter 212 may update the joint probability distribution of the control parameters using the evaluation results and the Kalman gain. For instance, at step 412, the Kalman filter 212 may update the mean and variance of the joint probability distribution of the control parameters predicted at step 404. For example, the mean and the variance are mathematically updated using Equations (10a) and (10b) respectively.

$$\theta_k = \theta_{k-1} + K_k(y_k - h(\theta_{k|k-1}))$$ Equation (10a)

$$P_{k|k} = P_{k|k-1} - K_k S_k K_k^T$$ Equation (10b).

Further, the Kalman filter 212 may output the updated joint probability distribution defined by the mean, $\theta_k$, and the variance, $P_{k|k}$, as the control parameters for controlling the machine.

Figure 4B:
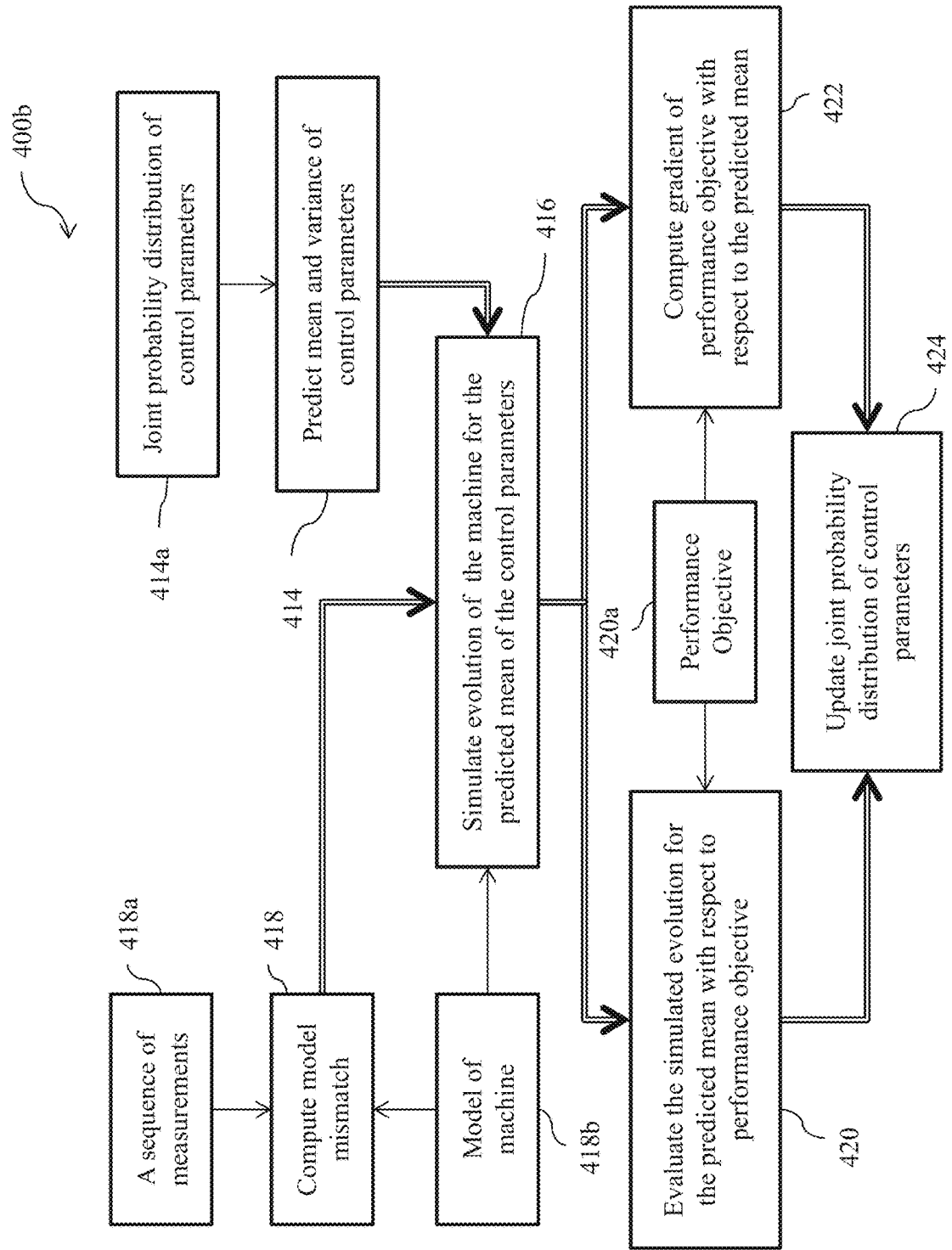
FIG. 4B illustrates a method executed by the Kalman filter, according to some other embodiments of the present disclosure.

FIG. 4B illustrates a method 400b executed by the Kalman filter 212, according to some other embodiments of the present disclosure. FIG. 4B is explained in conjunction with FIG. 2B. The Kalman filter 212 may execute the method 400b, when the Kalman filter 212 corresponds to an Extended Kalman filter (EKF). At step 414, the Kalman filter 212 may predict the mean and the variance of the control parameters using a joint probability distribution 414a of the control parameters. For instance, the joint probability distribution 414a may be the prior knowledge 218a of the control parameters that is defined by the mean, $\theta_{k-1}$, and the variance, $P_{k-1|k-1}$. According to an embodiment, the prediction model 218 of the Kalman filter 212 may be configured to predict the mean and the variance of the control parameters using the joint probability distribution 414a. For instance, when the Kalman filter 212 corresponds to the EKF, the prediction model 218 may be designed (or stated) such that the prediction model 218 predicts the mean and the variance of the control parameters that remain fixed (or constant) within the variance defined by the process noise. In other words, when the Kalman filter 212 corresponds to the EKF, the prediction model 218 may be designed such that the prediction model 218 predicts the control parameters that do not change with respect the control parameters represented by the joint probability distribution 414a. In this case, the prediction model 218 may be an identity model. For instance, the identity model may be an identity matrix. For example, the predicted mean and the predicted variance of the control parameters may be as in Equations (11a) and (11b) respectively.

$$\theta_{k|k-1} = \theta_{k-1}$$ Equation (11a)

$$P_{k|k-1} = P_{k-1|k-1} + C_\theta$$ Equation (11b)

where the notation $C_\theta$ is the variance matrix of the process noise.

At step 416, the Kalman filter 212 may simulate the evolution of the machine (e.g. the machine 202) for the predicted mean. In order to simulate the evolution of the machine, the Kalman filter 212, at step 418, may compute the model mismatch using a sequence of measurements 418a and a model 418b of the machine. For instance, the sequence of measurements 418a may correspond to the measurements 220a. For instance, the model 418b of the machine may be the model 106 (explained in FIG. 1). For example, the model mismatch may be mathematically computed as: $w_k = x_{k+1} - f(x_k, u_k) \forall k = t_{-N}, \ldots, 0$.

Further, the Kalman filter 212, at step 416, may simulate the evolution of the machine for the predicted mean using the computed model mismatch and the model 418b of the machine. For instance, the evolution of the machine may be a hypothetical evolution of the machine that would have resulted if the machine were controlled with the control parameters defined by the predicted mean. For example, the evolution of the machine may be mathematically simulated using Equation (12).

$$\hat{x}_{k+1} = f(\hat{x}_k, u_k) + w_k, u_k = \kappa_{\theta_{k|k-1}}(\hat{x}_k) \forall k = t_{-N}, \ldots, 0$$ Equation (12)

$$\hat{x}_{t_{-N}}^i = x_{t_{-N}}$$

where the notation $\kappa_{\theta_{k|k-1}}$ is the control policy defined by the control parameters $\theta_{k|k-1}$, the notation $w_k$ is the model mismatch, the notation $x_{t_{-N}}$ denotes the state of the machine at time $t_{-N}$, and the notation $\hat{x}_k$ with $k = t_{-N}, \ldots, 0$ denotes the hypothetical state evolution for the control parameters $\theta_{k|k-1}$.

At step 420, the Kalman filter 212 may evaluate the simulated evolution for the predicted mean with respect to a performance objective 420a. For instance, the performance objective 420a may be the performance objective 220b. For example, the evaluation for the predicted mean with respect to the performance objective 420a may be mathematically performed using Equation (13).

$$\hat{h}_k = h(\theta_{k|k-1})$$ Equation (13).

At step 422, the Kalman filter 212 may compute a gradient of the performance objective 420a with respect to the predicted mean. In an example embodiment, the gradient may define how the control parameters should be adapted to optimize the performance of the closed-loop machine with respect to the performance objective 420a. For example, the gradient of the performance objective 420a with respect to the predicted mean may be mathematically computed using Equation (14).

$$H_k = \frac{\partial h(\theta)}{\partial \theta}\bigg|_{\theta = \theta_{k|k-1}}.$$ Equation (14)

The Kalman filter 212, at step 422, may further compute the Kalman gain using the computed gradient of the performance objective 420a. For example, the Kalman gain may be mathematically computed using Equation (15).

$$K_k = P_{k|k-1} H_k^T (H_k P_{k|k-1} H_k^T + C_v)^{-1}$$ Equation (15)

where the notation $C_v$ is the measurement noise of the Kalman filter 212.

At step 424, the Kalman filter 212 may update the joint probability distribution of the control parameters using the Kalman gain, the evaluation results, and the gradient of the performance objective 420a. For instance, at step 424, the Kalman filter 212 may update the mean and variance of the joint probability distribution of the control parameters predicted at step 414. For example, the mean and the variance may be mathematically updated using Equations (16a) and (16b) respectively.

$$\theta_k = \theta_{k|k-1} + K_k(y_k - \hat{h}_k)$$ Equation (16a)

$$P_{k|k} = (I - K_k H_k) P_{k|k-1}$$ Equation (16b).

Further, the Kalman filter 212 may output the updated joint probability distribution defined by the mean, $\theta_k$, and the variance, $P_{k|k}$, as the control parameters for controlling the machine.

Figure 5:
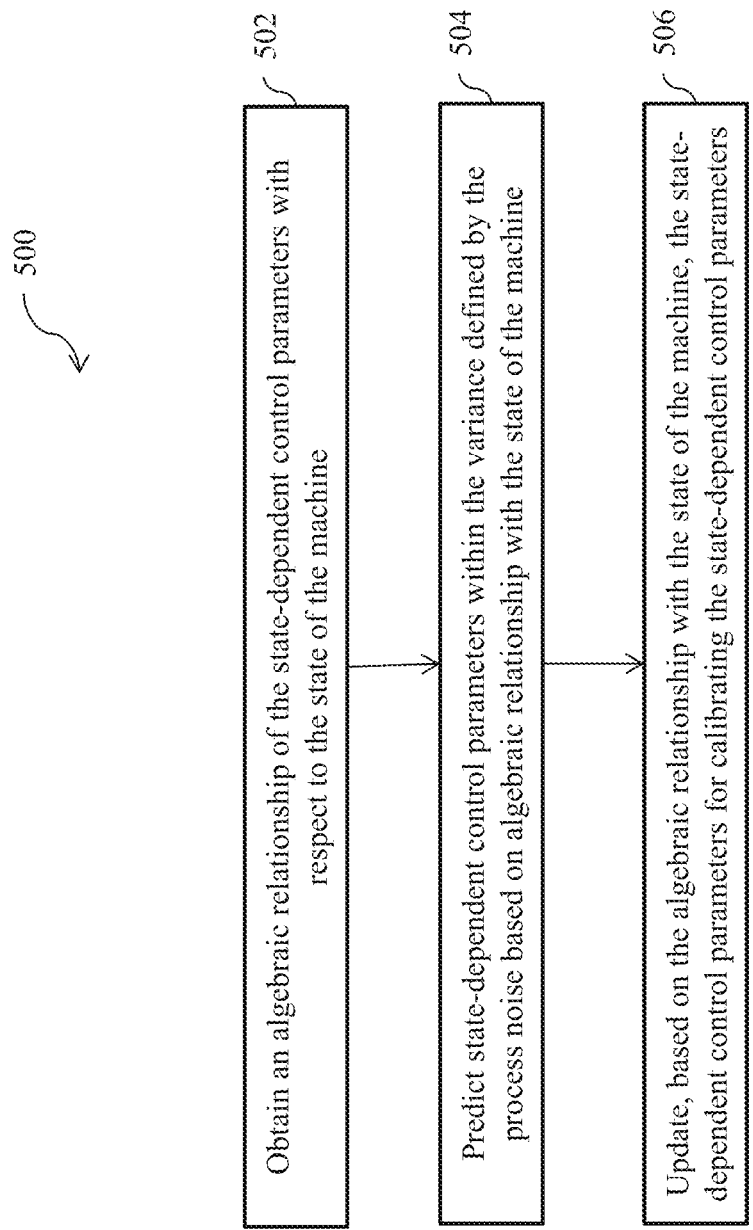
FIG. 5 illustrates a method for calibrating state-dependent control parameters, according to some embodiments of the present disclosure.

FIG. 5 illustrates a method 500 for calibrating state-dependent control parameters, according to some embodiments of the present disclosure. FIG. 5 is explained in conjunction with FIG. 2A and FIG. 2B. Some embodiments are based on the recognition that the set of control parameters of the feedback controller 212 may include at least some control parameters that depend on the state of the machine 202. For example, the friction of the tire of the vehicle may dependent on the velocity of the vehicle. Hereinafter, 'the at least some control parameters that depend on the state of the machine' and 'state-dependent control parameters' may be interchangeably used to mean the same. If the set of control parameters includes the state-dependent control parameters, then the calibration of the control parameters may be challenging because these state-dependent control parameters may be continuously varying with respect to the state of the machine. In these embodiments, the Kalman filter 212 may execute the method 500 for calibrating the state-dependent control parameters.

At step 502, the Kalman filter 212 may obtain an algebraic relationship of the state-dependent control parameters with respect to the state of the machine 202. In an example embodiment, the algebraic relationship of the state-dependent control parameters may be obtained as a linear combination of the state-dependent control parameters with basis function. For instance, the basis function may be a function of the state of the machine 202. The basis function may be defined by one or multiple state-dependent regions. For example, the linear combination of the state-dependent control parameters with the basis function is as shown in Equation (17).

$$\Theta = \begin{cases} \theta_1^T \phi(x) & \text{if } c(x) \leq \psi \\ \theta_2^T \phi(x) & \text{else} \end{cases} \qquad \text{Equation (17)}$$

where the notation $\Theta$ denotes the state-dependent control parameters of the feedback controller 210, the notation $\phi(x)$ is the basis function that is the function of the state (x) of the machine 202, the representation $c(x) \leq \psi$ defines a first state-dependent region, the notation $\theta_1^T$ denotes the state-dependent control parameters for the first state-dependent region and the notation $\theta_2^T$ denotes the state-dependent control parameters for a second region. The notation $\psi$ denotes a boundary that separates the first state-dependent region from the second state-dependent region. In other words, $\theta_1^T$ and $\theta_2^T$ are the coefficients of the basis function.

At step 504, the Kalman filter 212 may predict the state-dependent control parameters within the variance defined by the process noise based on the algebraic relationship with the state of the machine 202. For instance, the prediction model 218 of the Kalman filter 212 may be designed (or stated) such that the prediction model 218 predicts the state-dependent control parameters within the variance defined by the process noise based on the algebraic relationship with the state of the machine 202. For example, when the algebraic relationship of the state-dependent control parameters correspond to the linear combination of the state-dependent control parameters with the basis function, the prediction model 218 may be configured to check if the basis function is defined by more than one state-dependent region. If the basis function is not defined by more than one state-dependent region, then the prediction model 218 may be configured to predict coefficient of the basis function.

If the basis function is defined by more than one state-dependent region, then the prediction model 218 may be configured to check if the boundary $\psi$ that separates the state-dependent regions is fixed or varying. If the boundary $\psi$ is fixed, then the prediction model 218 may be configured to predict the coefficients, $\theta_1^T$ and $\theta_2^T$, of the basis function within the variance defined by the process noise. If the boundary $\psi$ is varying, then the prediction model 218 may be configured to predict the coefficients, $\theta_1^T$ and $\theta_2^T$, of the basis function along with the boundary $\psi$ within the variance defined by the process noise.

At block 506, the Kalman filter 212 may update, based on the algebraic relationship with the state of the machine 202, the state-dependent control parameters for calibrating the state-dependent control parameters. For instance, the measurement model 220 of the Kalman filter 212 may update the state-dependent control parameters based on the algebraic relationship with the state of the machine 202. For example, if the basis function is not defined by more than one state-dependent region, the measurement model 220 may be configured to update the coefficient (e.g. the predicted coefficient) of the basis function. For example, if (i) the basis function is defined by more than one state-dependent region and (ii) the boundary $\psi$ is fixed, then the measurement model 220 may be configured to update the coefficients (e.g. the predicted coefficients), $\theta_1^T$ and $\theta_2^T$, of the basis function for calibrating the state-dependent control parameters $\Theta$. For example, if (i) the basis function is defined by more than one state-dependent region and (ii) the boundary $\psi$ is varying, then the measurement model 220 may be configured to update the coefficients, $\theta_1^T$ and $\theta_2^T$, of the basis function along with the boundary $\psi$ for calibrating the state-dependent control parameters $\Theta$.

Figure 6A:
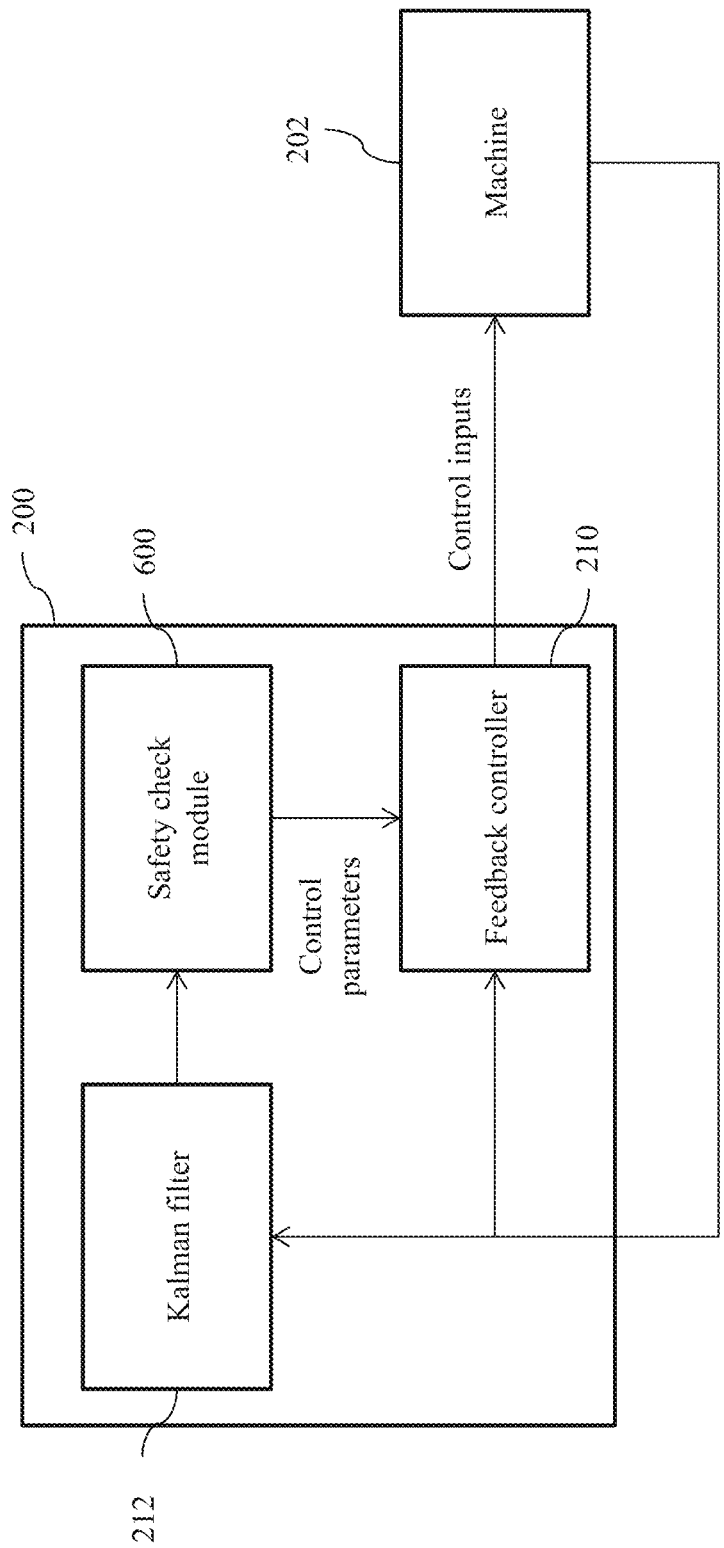
FIG. 6A illustrates a block diagram of the system for controlling the operation of the machine, according to some embodiments of the present disclosure.

FIG. 6A illustrates a block diagram of the system 200 for controlling the operation of the machine 202, according to some other embodiments of the present disclosure. FIG. 6A is explained in conjunction with FIG. 2A and FIG. 2B. Some embodiments are based on the realization that the online update of the control parameters may destabilize the operation of the machine 202. For example, when the control law or the control policy is represented by a differential equation (e.g. Ordinary Differential Equation (ODE)) with the control parameters, a change (an update) of the control parameters may break the stability of equilibrium of the differential equation. To this end, the system 200 may further include a safety check module 600. For instance, the safety check module 600 may be embodied within the at least one processor 204. Alternatively, the safety check module 600 may be a software module stored in the memory, which can be executed by the at least one processor 204. According to an embodiment, the safety check module 600 may be configured to execute a safety check method using the values of the control parameters produced by the Kalman filter 212 to ensure a safe operation of the machine 202. For instance, the safety check method executed by the safety check module 600 is as explained in the detailed description of FIG. 6B.

Figure 6B:
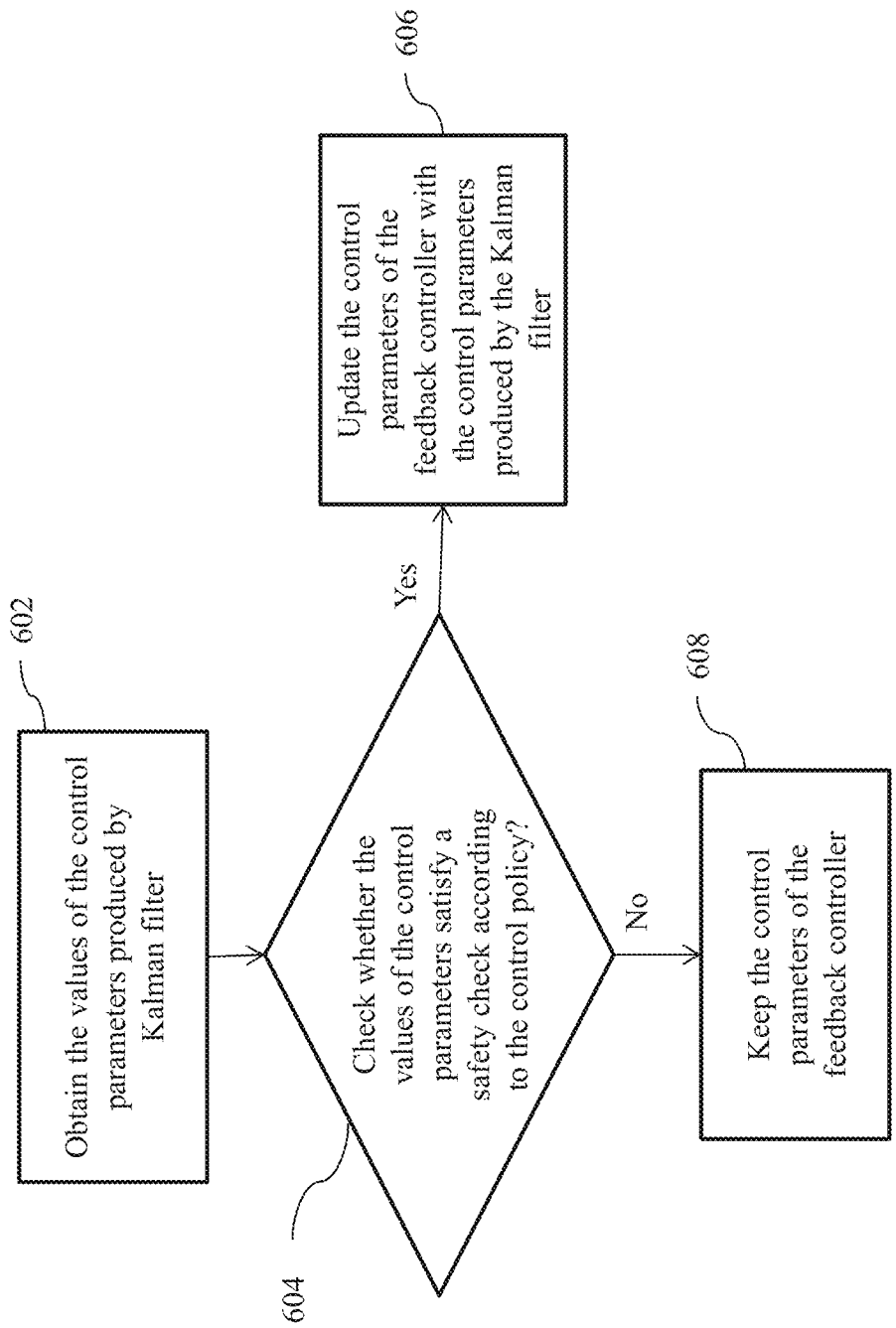
FIG. 6B illustrates a safety check method executed by a safety check module, according to some embodiments of the present disclosure.

FIG. 6B illustrates a safety check method executed by the safety check module 600, according to some embodiments of the present disclosure. FIG. 6B is explained in conjunction with FIG. 6A. At step 602, the safety check module 600 may obtain the values (e.g. the current values) of the control parameters produced by the Kalman filter 212.

At step 604, the safety check module 600 may check whether the values of the control parameters produced by the Kalman filter 212 satisfy a safety check according to the control policy. In other words, the safety check module 600 may check whether the values of the control parameters by the Kalman filter 212 provide a stable control of the machine 202, when the machine 202 is controlled by the feedback controller 210 according to the control policy that is updated with the control parameters produced by the Kalman filter 212. In order to check whether the control parameters produced by the Kalman filter 212 satisfy the safety check, the safety check module 600 may use previous state(s), the sequence of measurements (e.g. the sequence of measurements 220a), and/or the model (e.g. the model 106) of the machine 202.

For example, the safety check is satisfied, when there is a Lyapunov function for the control policy updated with the control parameters produced by the Kalman filter 212. In some embodiments, the existence of Lyapunov function can be proved by solving an optimization problem aiming to find the Lyapunov function. In one embodiment, the safety check is satisfied, when a decreasing cost of the state of the machine 202 with respect to the performance objective for entire history of states and the sequence of measurements is achieved, while controlling the machine 202 with the feedback controller 210 updated with the control parameters produced by the Kalman filter 212. In another embodiment, the safety check is satisfied, when a closeness (or boundedness) of the state of the machine 202 to origin is achieved, while controlling the machine 202 with the feedback controller 210 updated with the control parameters produced by the Kalman filter 212. In yet another embodiment, the safety check is satisfied, when a combination of the decreasing cost of the state of the machine 202 and the closeness of the state of the machine 202 to the origin is achieved. Accordingly, the safety check may include one or a combination of the decreasing cost of the state of the machine 202 and the closeness of the state of the machine 202. For instance, the safety check module 600 performing the safety check is as explained in the detailed description of FIG. 6C.

Figure 6C:
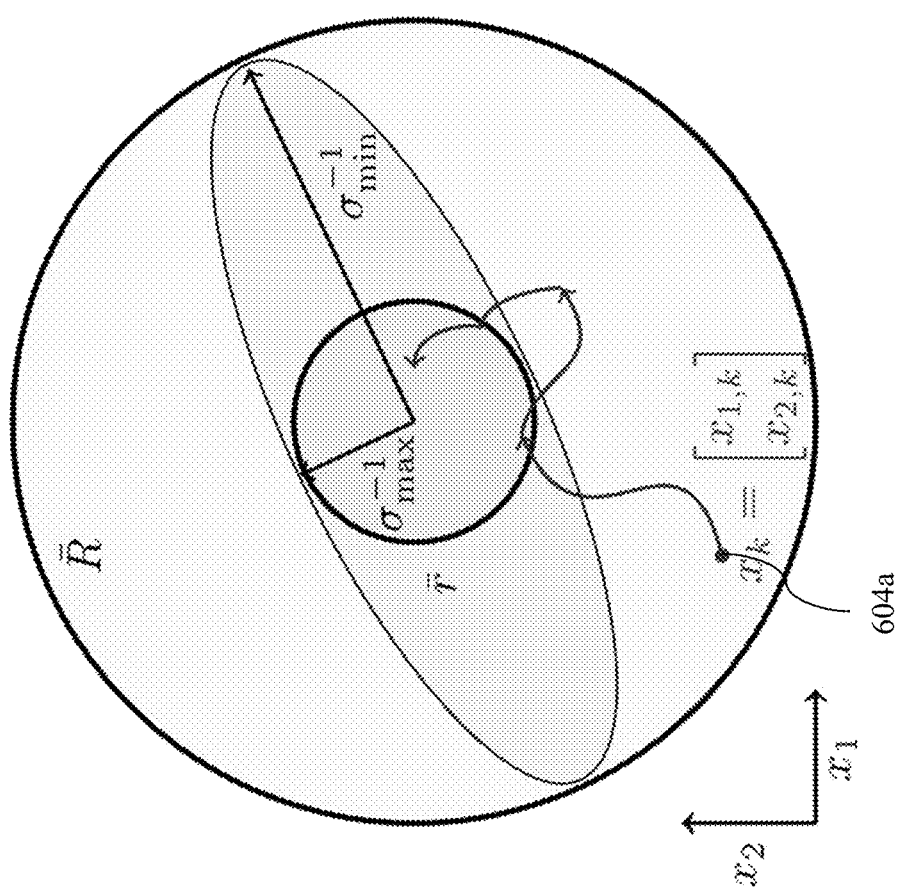
FIG. 6C illustrates the evolution of the state of the machine, according to some other embodiments of the present disclosure.

FIG. 6C illustrates the evolution of the state of the machine 202, according to some other embodiments of the present disclosure. FIG. 6C is explained in conjunction with FIG. 6A. As illustrated in FIG. 6C, a state 604a of the machine 202 may start within a radius $\bar{R}$, around the origin. After the machine 202 evolves, the state 604a comes within a radius $\bar{r}$, around the origin. In this example, the radius $\bar{r}$ is determined using a maximum eigenvalue $\sigma_{max}$ and a minimum eigenvalue $\sigma_{min}$ of a positive definite matrix P that defines a function with $V(x_k)=x_k^T P x_k$. In particular, if $\|x_k\|_2 \bar{r}\sigma_{min}^{-1}/\sigma_{max}^{-1} < \bar{R}$, then the state 604a of the machine 202 is guaranteed to remain bounded, $\|x_{k+1}\|_2 < \bar{R}$.

Referring back to FIG. 6B, when the values of the control parameters produced by the Kalman filter 212 do not satisfy the safety check, the safety check module 600, at step 608, may keep the control parameters of the feedback controller 210. In other words, when the safety check fails, the safety check module 600 may not update the control parameters of the feedback controller 210 with the control parameters produced by the Kalman filter 212. Further, the Kalman filter 212 may be configured to iteratively produce new values of the control parameters until the safety check is satisfied. Notably, the Kalman filter 212 should not be restarted even if the control parameters produced by the Kalman filter 212 do not satisfy the safety check.

When the values of the control parameters produced by the Kalman filter 212 satisfy the safety check, the safety check module 600, at step 606, may update the control parameters of the feedback controller 210 with the control parameters produced by the Kalman filter 212. In this way, the safety check module 600 may ensure the stability of the control while an online update of the control parameters of the feedback controller 210.

Referring back to FIG. 6A, once the control parameters of the feedback controller 210 is updated, the feedback controller 210 may be configured to determine the control inputs for controlling the operation of the machine 202 by applying the control policy that is updated with the control parameters produced by the Kalman filter 212.

Some embodiments are based on the understanding that the online update of the control parameters of the feedback controller 210 may improve the quality of the control but at an expense of additional challenges. For example, the online update of the control parameters during the operation of the machine 202 may introduce a discontinuity of control. Some embodiments are based on the realization that the discontinuity of the control can be handled forcing a control command to satisfy a constraint on the operation of the machine 202. To this end, the feedback controller 210 may be configured to determine the control inputs (e.g. the current control inputs) using the control command that satisfies the constraints on the operation of the machine 202. In other words, the feedback controller 210 may be configured to determine the control inputs subject to the constraint on the operation of the machine 202 thereby handling the discontinuity of the control. For instance, the control command satisfies the constraint on the operation of the machine 202, when the control parameters (e.g. the current control parameters) satisfy control-theoretic properties. For example, the control-theoretic properties may be specified by the designer.

FIG. 7 illustrates a list of performance objectives used by the Kalman filter 212, according to some embodiments of the present disclosure. FIG. 7 is explained in conjunction with FIG. 2B. The performance objective 220b can include:
a cost function 700 defining a deviation of the state(s) of the machine from a target state of the machine, $y_k=x_{ref}$ and $h(\theta_k)=x_k$;
a cost function 702 defining a deviation of the control input(s) from a reference control input, $y_k=u_{ref}$ and $h(\theta_k)=u_k$;
a cost function 704, $c_1$, for the state exceeding a certain range of operation, $y_k=0$ and $$h(\theta_k) = \begin{cases} 0 & \text{if } x \in X \\ c_1 & \text{else} \end{cases};$$

a cost function 706, $c_2$, for the control input exceeding a certain range of operation, $y_k=0$ and $$h(\theta_k) = \begin{cases} 0 & \text{if } u \in U \\ c_2 & \text{else} \end{cases};$$

a cost function 708, $c_3$, to penalize oscillations of one or more states, e.g., $y_k=0$, $h(\theta_k)=c_3 \cdot \#\text{sign changes}(x_k)$ within 3 seconds;
a cost function 710, $c_4$, to penalize oscillations of one or more control inputs, e.g., $y_k=0$, $h(\theta_k)=c_4 \cdot \#\text{sign changes}(u_k)$ within 3 seconds;
a cost function 712, $c_5$, if the reference/target state is overshoot by a certain value, e.g., $y_k=0$, $$h(\theta_k) = \begin{cases} 0 & \text{if } x_k \leq 1.1(x_{ref} - x_0) \\ c_5 & \text{else} \end{cases};$$

a cost function 714, $c_6$, if the control input exceeds a certain region of operation for a certain time, e.g., $y_k=0$, $$h(\theta_k) = \begin{cases} c_6 & \text{if } u \notin U \text{ for more than 1 seconds} \\ 0 & \text{else} \end{cases};$$

a cost function 716 if the states change between time steps, e.g., $y_k=0$, $h(\theta_k)=\|x_{k+1}-x_k\|_2$;

a cost function 718 if the control inputs change between time steps, e.g., $y_k=0$, $h(\theta_k)=\|u_{k+1}-u_k\|_2$;

a cost function 720, $c_7$, if the states change quicker than a certain value between time steps, e.g., $y_k=0$, $$h(\theta_k) = \begin{cases} 0 & \text{if } \|x_{k+1}-x_k\|_2 \leq \bar{x} \\ c_7 & \text{else} \end{cases};$$

and a cost function 722, $c_8$, if the control inputs change quicker than a certain value between time steps, e.g., $$y_k = 0, h(\theta_k) = \begin{cases} 0 & \text{if } \|u_{k+1}-u_k\|_2 \leq \bar{u} \\ c_8 & \text{else} \end{cases}.$$

Additionally or alternatively, the performance objective 200*b* may include a cost function for certain control parameters (rather than the states or control inputs), e.g., $y_k=\theta_{nom}$, $h(\theta_k)=\theta_k$, where $\theta_{nom}$ defines nominal values for any or all control parameters.

In some embodiments, the measurement model 220 may be configured to select one among the list of performance objectives, based on one or a combination of the state of the machine and a state of an environment surrounding the machine. For example, depending up on the state(s) of the machine and/or the control parameters that are used to control the machine, the measurement model 220 may identify, from the list of performance objective, a cost function that severely degrades the performance of the control in comparison to other cost functions in the list of performance objectives. Further, the measurement model 220 may select the identified cost function as the performance objective 220*a*. For instance, if the cost function 700 severely degrades the performance of the control in comparison to other cost functions in the list of performance objectives, then the measurement model 220 may select the cost function 700 as the performance objective 200*a*. Further, the measurement model 220 may update the control parameter by optimizing (e g minimizing) the cost function 700 while producing the control parameters.

Some embodiments are based on the recognition that when the control parameters do not dependent on the states of the machine, then bound for an uncertainty of the control parameters can be predetermined. Hereinafter, 'the control parameters do not dependent on the states of the machine' and 'state-independent control parameters' can be interchangeably used to mean the same. In these embodiments, the Kalman filter 212 may select the one or a combination of the performance objective, the measurement noise, or the process noise, based on the bound. Further, some possible state-dependent control parameters and state-independent control parameters are as illustrated in FIG. 8A.

FIG. 8A illustrates a list of feedback controllers used in the system 200, according to some embodiments of the present disclosure. FIG. 8A is explained in conjunction with FIG. 2A. For a PID controller 800, the Kalman filter 212 may estimate the control parameters comprising the proportional gain $k_P$, the integral gain $k_I$, and the derivate gain $k_D$. For example, the control parameters for the PID controller 800 are, $$\theta = \begin{bmatrix} k_P \\ k_I \\ k_D \end{bmatrix}.$$

For an optimal controller 802, the Kalman filter 212 may estimate the control parameters comprising the weights, $\theta$, of the cost function. For example, the optimal controller 802 is, $$\min_{x_k,u_k} \theta^T \phi(x_0, \ldots, x_{N+1}, u_0, \ldots, u_N)$$

$$\text{s.t } x_{k+1} = f(x_k, u_k) \forall k = 0, \ldots, N$$

$$c(x_k, u_k) \leq 0 \ \forall k = 0, \ldots, N$$

$$x_0 = x(0)$$

with the constraints, $c(x_k,u_k) \leq 0$, and the initial state of the machine, $x(0)$. An example of an optimal control cost function is, $$\theta^T\phi(x_0, \ldots, x_{N+1}, u_0, \ldots, u_N) = \Sigma_{k=0}^N x_k^T Q x_k + u_k^T R u_k,$$

where the control parameters are $$\theta = \begin{bmatrix} vec(Q) \\ vec(R) \end{bmatrix}$$

with the function vec that vectorizes the matrices Q and R.

For a state feedback controller 804, the Kalman filter 212 may estimate the control parameters comprising the gains, $$u_k = Kx_k,$$

where the control parameters are $$\theta = vec(K).$$

For a dynamical output feedback controller 806 comprising the observer dynamics, $$\hat{x}_{k+1} = f(\hat{x}_k, u_k) + LC(x_k - \hat{x}_k),$$

$$u_k = K\hat{x}_k$$

where $\hat{x}_k$ is the state-estimate of the observer, C is the output matrix that maps the states of the machine to the measured outputs, the Kalman filter 212 may estimate the control parameters comprising the feedback gains, K, and an observer gain (also called Luenberger gain), L, $$\theta = \begin{bmatrix} vec(K) \\ vec(L) \end{bmatrix}.$$

For a sliding mode controller 808, e.g., with control law $$u_k = K(r,x_k) - \rho \cdot \text{sign}(r^T x_k),$$

where $s_k = r^T x_k$ is a sliding surface and $K(r,x_k)$ is a control law that depends on the machine and ensures that the machine slides along the surface $s_k = r^T x_k$. Here, the control parameters are $$\theta = \begin{bmatrix} p \\ r \end{bmatrix}.$$

For a neural network-based controller 810, e.g., with a control law $$u_k = \sigma_y(W_y \sigma_x(W_x x_k)),$$

where $\sigma_y$ and $\sigma_x$ are some activation functions, the control parameters estimated by the Kalman filter 212 comprise the weights of the neural network, $$\theta = \begin{bmatrix} vec(W_y) \\ vec(W_x) \end{bmatrix}.$$

For a $H_\infty$ controller 812, the Kalman filter 212 may estimate filter coefficients of a pre-compensator and a post-compensator, which are used to determine a trade-off between performance and robustness. For example, the $H_\infty$ controller 812 is shown in FIG. 8B.

Figure 8B:
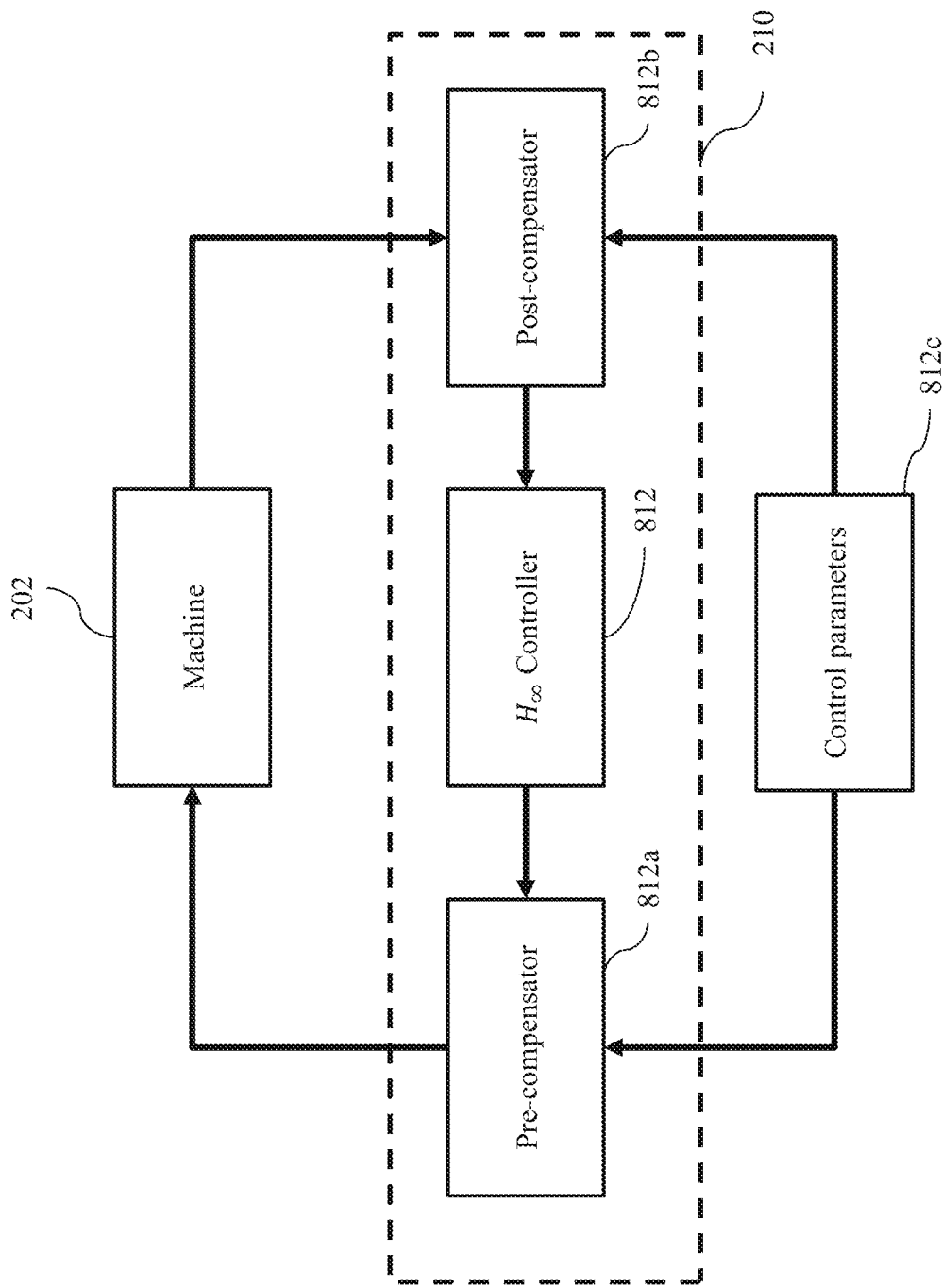
FIG. 8B illustrates a block diagram showing a feedback controller for controlling the machine, according to some embodiments of the present disclosure.

FIG. 8B illustrates a block diagram showing the feedback controller 210 for controlling the machine 202, according to some embodiments of the present disclosure. In an example embodiment, the feedback controller 210 may include the $H_\infty$ controller 812, a pre-compensator 812a, and a post-compensator 812b. In frequency domain, the pre-compensator 812a and the post-compensator 812b are $$H_{pre}(s) = \frac{[s^{n_{pre,nom}} \quad s^{n_{pre,nom}-1} \quad \ldots \quad s \quad 1]\theta_{pre,nom}}{[s^{n_{pre,nom}} \quad s^{n_{pre,denom}-1} \quad \ldots \quad s \quad 1]\theta_{pre,denom}}$$

$$H_{post}(s) = \frac{[s^{n_{post,nom}} \quad s^{n_{post,nom}-1} \quad \ldots \quad s \quad 1]\theta_{post,nom}}{[s^{n_{post,denom}} \quad s^{n_{post,nom}-1} \quad \ldots \quad s \quad 1]\theta_{post,denom}},$$

where the integers $n_{pre,nom}$, $n_{pre,denom}$, $n_{post,nom}$, $n_{post,denom}$ define the order of the pre-compensator 812a and the post-compensator 812b. Control parameters 812c estimated by the Kalman filter 212 are $$\theta = \begin{bmatrix} \theta_{pre,nom} \\ \theta_{pre,denom} \\ \theta_{post,nom} \\ \theta_{post,denom} \end{bmatrix}.$$

Here, the $H_\infty$ controller 812 may be computed by minimizing a maximum magnitude in the frequency response of the machine 202.

Figure 9:
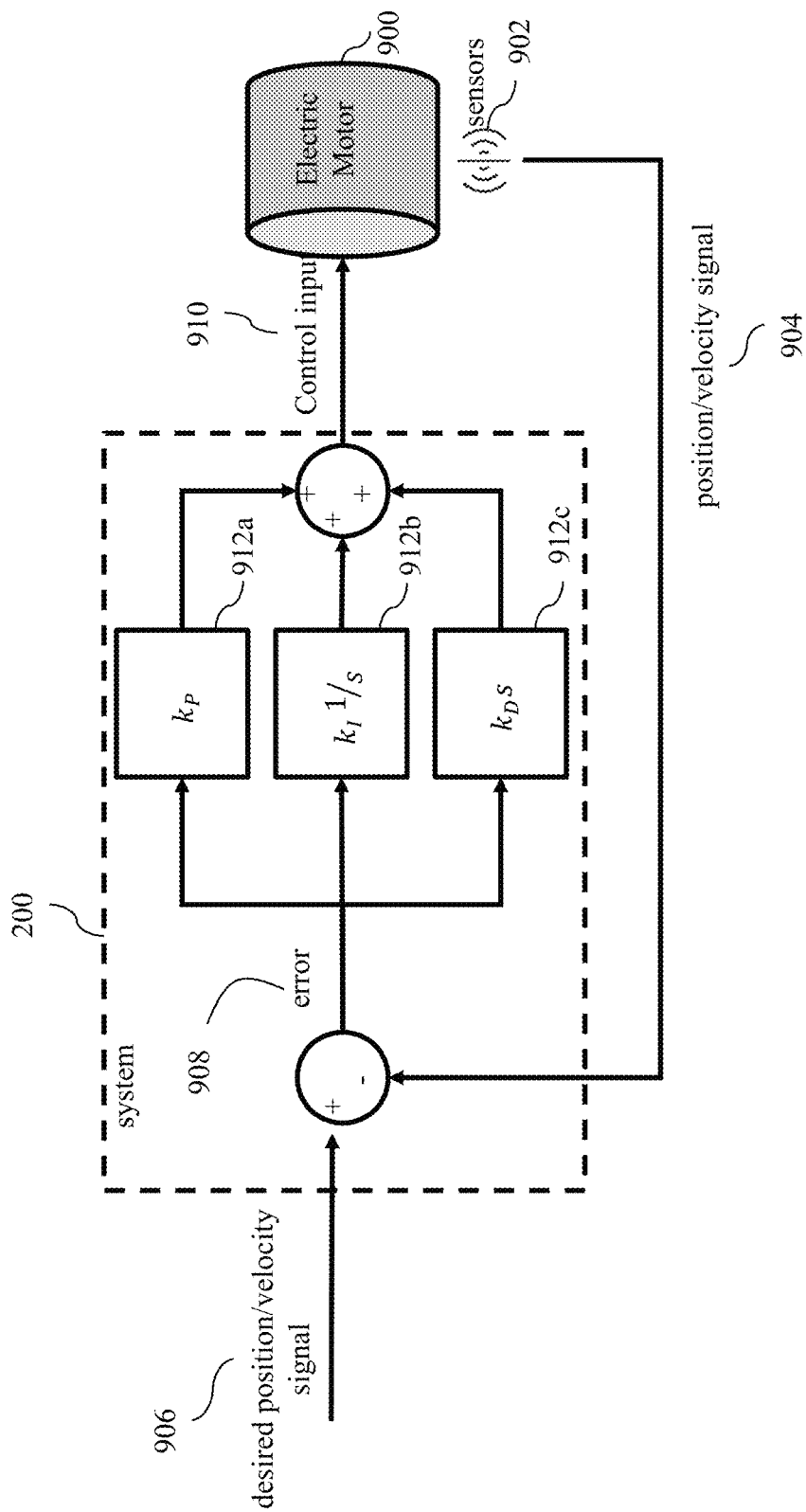
FIG. 9 illustrates a schematic of the system for controlling an electric motor, according to some embodiment of the present disclosure.

FIG. 9 illustrates a schematic of the system 200 for controlling an electric motor 900, according to some embodiment of the present disclosure. In this example, the feedback controller of the system 200 may be the PID controller that controls the electric motor 900. The system 200 may receive, from sensors 902 installed at the electric motor 900, a position or velocity signal 904 (e.g. the feedback signal 216). Further, the system 200 may receive a desired position or velocity signal 906 (e.g. the control command) to compute an error signal 908. Furthermore, the system 200 may calibrate the proportional gain $k_P$, the integral gain $k_I$, and the derivate gain $k_D$. Furthermore, the system 200 may determine, using the error signal 908, the control inputs 910 by applying the control policy. For instance, the control policy may be a summation of three components, for example, a proportional component 912a that is obtained multiplying the error with the calibrated proportional gain $k_P$, an integral component 912b that is obtained by integrating the error and multiplying the integrated error with the calibrated integral gain $k_I$, and a derivative component 912c that is obtained by finding a derivate of the error with respect to time and multiplying the derivate with the calibrated derivate gain $k_D$. Furthermore, the system 200 may submit the determined control inputs 910 to the electric motor for controlling the electric motor 900.

Figure 10:
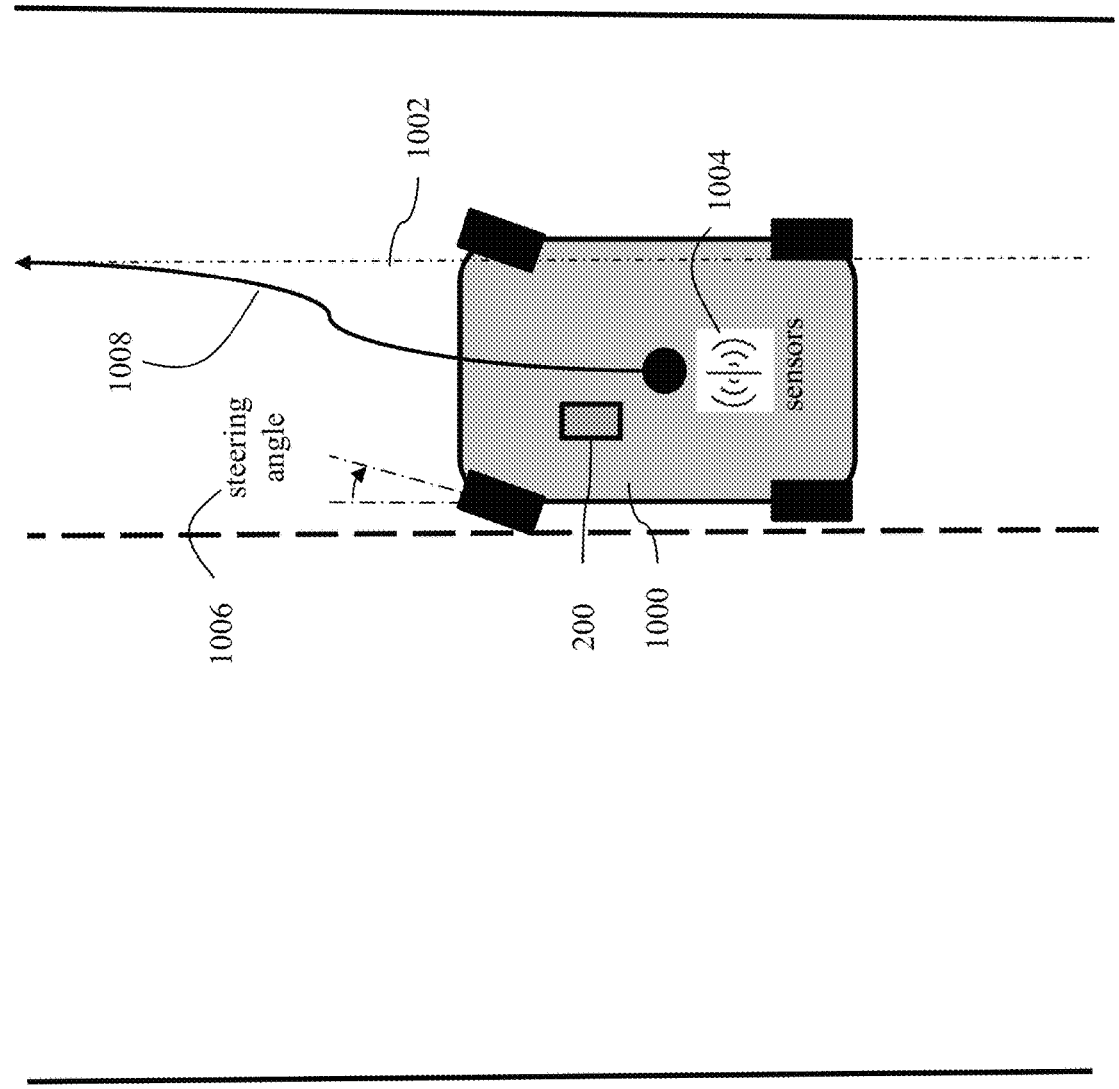
FIG. 10 illustrates a schematic of the system for controlling a vehicle, according to some embodiments of the present disclosure.

FIG. 10 illustrates a schematic of the system 200 for controlling a vehicle 1000, according to some embodiments of the present disclosure. In this example, the system 200 may control the vehicle 1000 such that the vehicle 1000 stays in the middle of a lane 1002. The system 200 may receive, from sensors 1004, a position and/or velocity signal. The system 200 may further calibrate one or more control parameters associated with a control policy. For example, the control parameter may be a friction of a tire of the vehicle 1000 with a road. Furthermore, the system 200 may determine control inputs by applying the control policy that is updated with the calibrated one or more control parameters. For instance, the system 100 may determine the control inputs such that the control inputs make the vehicle 1000 to stay in the middle of the lane 1002. For example, the determined control inputs may be a steering angle 1006, which makes the vehicle 1000 to propagate in a vehicle trajectory 1008 that converges to the middle of the lane 1002.

The above description provides exemplary embodiments only, and is not intended to limit the scope, applicability, or configuration of the disclosure. Rather, the above description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the above description to provide a thorough understanding of the embodiments. However, understood by one of ordinary skill in the art may be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination may correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Although the present disclosure has been described with reference to certain preferred embodiments, it is to be understood that various other adaptations and modifications may be made within the spirit and scope of the present disclosure. Therefore, it is the aspect of the append claims to cover all such variations and modifications as come within the true spirit and scope of the present disclosure.

The invention claimed is:

1. A system for controlling an operation of a machine for performing a task, comprising:
a transceiver configured to submit a sequence of control inputs to the machine and to receive a feedback signal including a corresponding sequence of measurements, wherein each measurement is indicative of a state of the machine caused by the corresponding control input;
a feedback controller configured to determine, at each control step, a current control input for controlling the machine based on the feedback signal including a current measurement of a current state of the machine by applying a control policy transforming the current measurement into the current control input based on current values of control parameters in a set of control parameters of the feedback controller to achieve a performance objective of the feedback controller, wherein the performance objective comprises a cost function defining a deviation of the state of the machine from a reference state of the machine; and
a Kalman filter configured to iteratively update a state of the feedback controller defined by the control parameters using a prediction model for predicting values of the control parameters subject to process noise, and a measurement model for updating the predicted values of the control parameters based on the sequence of measurements subject to measurement noise, to produce the current values of the control parameters that are associated with the sequence of measurements according to the performance objective.

2. The system of claim 1, wherein the Kalman filter is further configured to adjust a Kalman gain for calibrating multiple interdependent control parameters.

3. The system of claim 1, wherein the prediction model is an identity model that is configured to predict that the control parameters remain fixed within a variance defined by the process noise.

4. The system of claim 1, wherein the prediction model is configured to predict at least some control parameters within a variance defined by the process noise based on an algebraic relationship with the state of the machine.

5. The system of claim 1, wherein the performance objective is different from the control policy.

6. The system of claim 1, wherein the measurement model is configured to update the control parameters by optimizing the cost function.

7. The system of claim 1, wherein the performance objective further comprises one or a combination of a cost function for the state exceeding an optimal region of operation, a cost function if a reference state is overshot by a certain value, a cost function for oscillations of the state, and a cost function if the state changes between time steps.

8. The system of claim 1, wherein the control parameters include one or a combination of: (i) one or multiple gains of the feedback controller, (ii) one or multiple structural parameters of the machine, (iii) one or multiple coefficients of one or multiple filters used by the feedback controller, or (iv) one or multiple weights of a neural-network controller.

9. The system of claim 1, wherein to produce the control parameters, the Kalman filter is configured to update coefficients of a basis function in one or multiple state-dependent regions.

10. The system of claim 1, wherein to produce the control parameters, the Kalman filter is configured to update coefficients of a basis function in multiple state-dependent regions along with a boundary that separates the multiple state-dependent regions.

11. The system of claim 1, wherein the Kalman filter is an extended Kalman filter (EKF) that is configured to compute a Kalman gain by computing a gradient of the performance objective.

12. The system of claim 1, wherein the Kalman filter is an unscented Kalman filter (UKF) that is configured to compute a Kalman gain by evaluating the control parameters with respect to the performance objective.

13. The system of claim 1, wherein the feedback controller is configured to determine the current control input subject to a constraint on the operation of the machine thereby handling the discontinuity of the control.

14. The system of claim 1, further comprising a safety check module configured to:
perform a check associated with whether the values of the control parameters produced by the Kalman filter satisfy a safety check according to the control policy; and
update the control parameters of the feedback controller with the control parameters produced by the Kalman filter when the safety check is satisfied.

15. The system of claim 14, wherein when the values of the control parameters produced by the Kalman filter do not satisfy the safety check, the Kalman filter is further configured to iteratively produce new values of the control parameters until the safety check is satisfied.

16. The system of claim 14, wherein the safety check includes one or a combination of a boundedness of the state to an origin and a decreasing cost of the state.

17. A method for controlling an operation of a machine for performing a task, comprising:
submitting a sequence of control inputs to the machine;
receiving a feedback signal including a corresponding sequence of measurements, wherein each measurement is indicative of a state of the machine caused by the corresponding control input;
determining, at each control step, a current control input for controlling the machine based on the feedback signal including a current measurement of a current state of the machine by applying a control policy transforming the current measurement into the current control input based on current values of control parameters in a set of control parameters of a feedback controller to achieve a performance objective of the feedback controller, wherein the performance objective comprises a cost function defining a deviation of the state of the machine from a reference state of the machine; and
iteratively updating a state of the feedback controller defined by the control parameters using a prediction model predicting values of the control parameters subject to process noise and a measurement model updating the predicted values of the control parameters based on the sequence of measurements subject to measurement noise to produce the current values of the control parameters that explain the sequence of measurements according to the performance objective.

18. A non-transitory computer readable storage medium embodied thereon a program executable by a processor for performing a method for controlling an operation of a machine for performing a task, the method comprising:
submitting a sequence of control inputs to the machine;
receiving a feedback signal including a corresponding sequence of measurements, wherein each measurement is indicative of a state of the machine caused by the corresponding control input;
determining, at each control step, a current control input for controlling the machine based on the feedback signal including a current measurement of a current state of the machine by applying a control policy transforming the current measurement into the current control input based on current values of control parameters in a set of control parameters of a feedback controller to achieve a performance objective of the feedback controller, wherein the performance objective comprises a cost function defining a deviation of the state of the machine from a reference state of the machine; and
iteratively updating a state of the feedback controller defined by the control parameters using a prediction model predicting values of the control parameters subject to process noise and a measurement model updating the predicted values of the control parameters based on the sequence of measurements subject to measurement noise to produce the current values of the control parameters that explain the sequence of measurements according to the performance objective.

* * * * *